US009311901B2

(12) United States Patent
Webster et al.

(10) Patent No.: US 9,311,901 B2
(45) Date of Patent: Apr. 12, 2016

(54) VARIABLE BLEND WIDTH COMPOSITING

(71) Applicant: CANON KABUSHIKI KAISHA, Tokyo (JP)

(72) Inventors: Steven David Webster, Scotland Island (AU); Dmitri Katchalov, Neutral Bay (AU); Quang Tuan Pham, North Ryde (AU)

(73) Assignee: Canon Kabushiki Kaisha, Tokyo (JP)

( * ) Notice: Subject to any disclaimer, the term of this patent is extended or adjusted under 35 U.S.C. 154(b) by 106 days.

(21) Appl. No.: 14/317,492

(22) Filed: Jun. 27, 2014

(65) Prior Publication Data

US 2015/0002545 A1 Jan. 1, 2015

(30) Foreign Application Priority Data

Jun. 28, 2013 (AU) ................................ 2013206601

(51) Int. Cl.
*G09G 5/377* (2006.01)
*G06T 11/60* (2006.01)
(52) U.S. Cl.
CPC ................ *G09G 5/377* (2013.01); *G06T 11/60* (2013.01)
(58) Field of Classification Search
CPC ... G09G 5/14; G09G 2340/125; G09G 5/395; G09G 2340/10; G06F 3/14
See application file for complete search history.

(56) References Cited

U.S. PATENT DOCUMENTS 5,557,339 A 9/1996 Dadourian
8,013,870 B2 9/2011 Wilensky

OTHER PUBLICATIONS

Motion 5 User Manual, Apple Inc., 2012., pp. 1202-1204.

*Primary Examiner* — Todd Buttram
(74) *Attorney, Agent, or Firm* — Canon USA Inc. IP Division

(57) ABSTRACT

A method of producing an image with a blurred background (151) from an initial image (111) and a depth map (112) identifying a foreground region (236) and a background region (237) of the image, said method comprising determining (670) an edge visibility measure (671) for one edge (231) in the depth map (112) by comparing (820) a pixel value (233) in the foreground with a pixel value (234) in the background, said edge visibility measure (671) distinguishing between the foreground (236) and the background (237); applying (680) a spatially variable blur to the depth map (112) to produce a compositing matte (681), dependent on the edge visibility measure (671); applying (530) a blur to the background region (521) of the depth map (112); and compositing (150) the blurred background image data (531) with the initial image (111) to produce the rendered image with the blurred background (151).

7 Claims, 14 Drawing Sheets

Fig. 2A
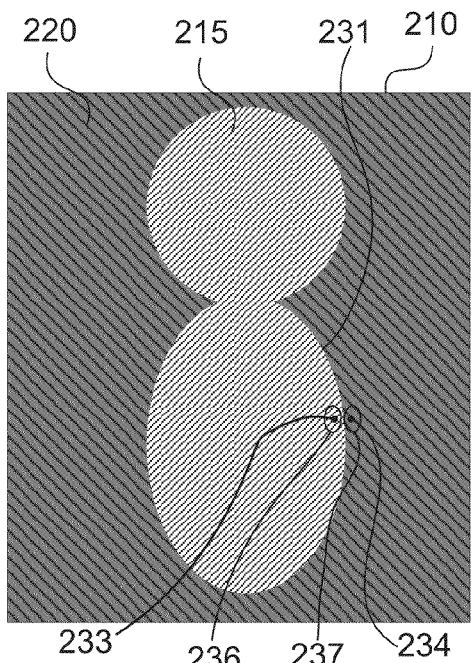
Fig. 2B
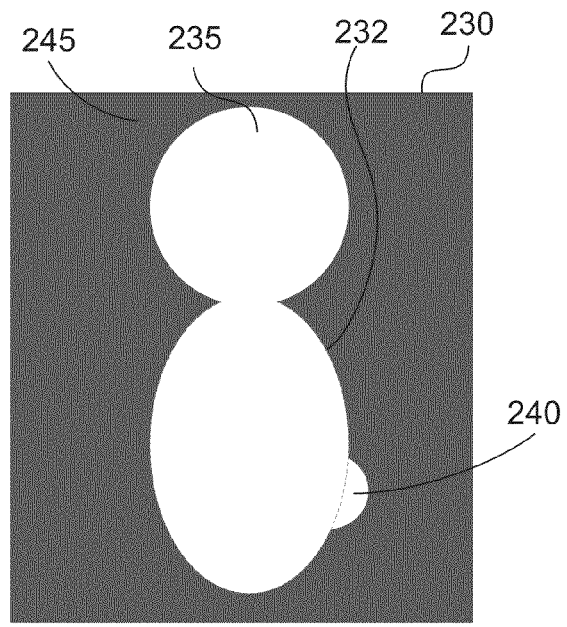
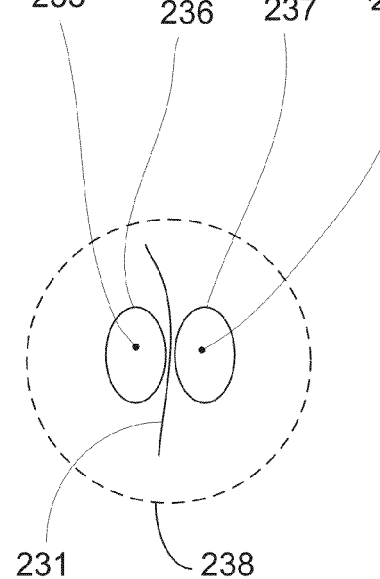
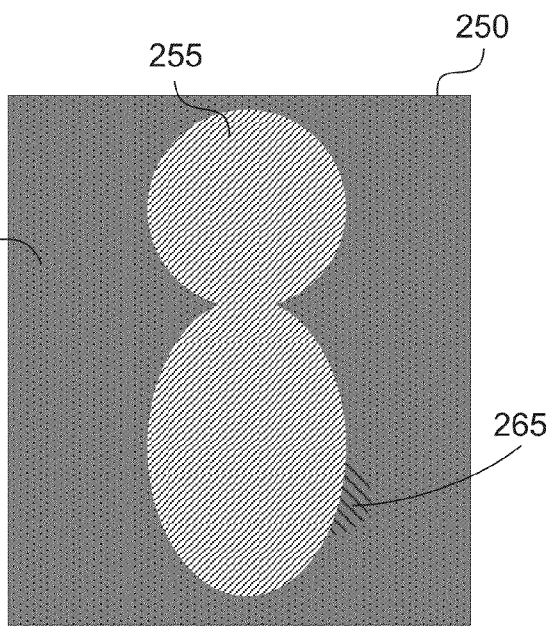
Fig. 2C

VARIABLE BLEND WIDTH COMPOSITING

REFERENCE TO RELATED PATENT APPLICATION(S)

This application claims the benefit under 35 U.S.C. §119 of the filing date of Australian Patent Application No. 2013206601, filed 28 Jun. 2013, hereby incorporated by reference in its entirety as if fully set forth herein.

TECHNICAL FIELD

The current invention relates to digital image processing and, in particular, to rendering a photographic image with modified blur characteristics.

BACKGROUND

When taking a photograph, only part of the scene will be in-focus with objects closer to or further away from the camera appearing blurry in the captured image. The degree of blurring grows larger with increasing distance from the in-focus region. The distance between the closest and most distant objects in a scene which appear acceptably sharp is known as the depth of field (DOF). In some photographic situations, such as portraits, it is highly desirable to have a narrow DOF as the resulting blurred background removes distractions and draws the viewer's attention to the in-focus subject.

Cameras such as single lens reflex (SLR) models are able to capture images with a narrow depth of field due to the large size of the sensor and lens. The large lens allows a corresponding large aperture to be selected to create the desired depth of field effect. Due to factors such as reduced cost and size, compact cameras are more popular than SLR cameras. However, photographs taken with compact cameras inherently have a greater DOF than images taken using an SLR camera with the same field of view and relative aperture due to optical constraints. One approach to producing SLR-like images in a compact camera is to post-process the captured image in conjunction with a depth map of the scene to reduce the apparent DOF. This is termed bokeh rendering. The depth map is used to selectively blur background pixels, leaving the subject in-focus.

In the simplest case, the captured image may be segmented into foreground and background depth layers using the depth map. The background layer is blurred and combined with the foreground using a compositing technique which makes use of an opacity matte, also known as an alpha matte. The alpha matte defines the relative contribution of each pixel in the final image from each of the two image layers. The compositing of two images for bokeh rendering may be described by the following equation:

$$C(x,y)=\alpha(x,y)F(x,y)+(1-\alpha(x,y))B(x,y), \quad (1)$$

Where x and y are pixel coordinates within the image, F is the three dimensional colour vector at each pixel location in the foreground image layer, B is the three dimensional colour vector at each pixel location in the blurred background, α is the opacity at each pixel location and C is the three dimensional colour vector at each pixel location in the resulting bokeh image. At pixel locations with an opacity value of 1, the final image comprises only foreground pixel values. At pixel locations with an opacity value of 0, the final image comprises only background pixel values. At pixel locations with fractional opacity values the final image comprises a mixture of foreground and background pixel values. The aesthetic quality of the resulting bokeh image depends crucially on the accuracy of the alpha matte. Errors of the order of a few pixels can result in unacceptable images.

Many techniques have been developed to obtain a depth map of a scene. These are classified as active (projecting light or other energy on to the scene) or passive (relying only on ambient light). A passive depth mapping method is often preferred because active methods, such as structured light, are expensive, require additional power, and may be intrusive or not function for outside scenes. However, passive mapping techniques are not able to obtain depth information for surfaces with low texture contrast, which leads to errors in the depth map. These errors may be reduced by analysing the original image to enforce correspondence between object edges and depth boundaries to produce a refined depth map. However in practice, significant errors remain in the refined depth map.

An in-focus region incorrectly blurred or a background region incorrectly rendered sharply because of an error in the depth map is easily noticeable as an obvious artefact.

Software applications have been developed for use on personal computers which allow a user to manually segment an image and composite the selected region over a new background. The width of the band of fractional alpha values of the compositing matte along the segmentation boundary may be adjusted by determining a feather width. Typically the feather width is constant for the entire compositing matte. If a depth map is used for segmentation, the user is required to manually correct any significant segmentation errors before generating and refining the matte used to composite the final image. Correcting the appearance around depth map errors requires tedious and time-intensive manual adjustments by a skilled user.

Another technique for generating a compositing matte is known as alpha matte estimation in which a single image is modelled as being a mixture of foreground and background according to equation (1). The goal of alpha matte estimation is to estimate α, F and B given only C, which is a severely under-determined problem. The estimated values are used to composite the estimated image F over a new background using the compositing matte α. State-of-the-art methods generally assume the image has already been segmented into an accurate trimap which assigns image pixels to one of three categories; regions of definite foreground, regions of definite background and the remaining unknown regions which require alpha estimation. In practice, alpha matte estimation algorithms are computationally expensive and do not achieve sufficient accuracy for high quality rendering, even given a correct trimap (such as generated by user interaction). A trimap may be estimated from a depth map, but this makes the situation even worse. Errors present in the depth map are propagated to the trimap, undermining the assumption of trimap accuracy required by alpha estimation methods.

Generation of high quality artificial bokeh images using a compact camera requires an improved method of rendering which minimises the visibility of artefacts caused by depth map errors, without human interaction. Existing methods of automatically generating a compositing matte are unable to cope with depth map errors, resulting in distracting visual artefacts.

SUMMARY

It is an object of the present invention to substantially overcome, or at least ameliorate, one or more disadvantages of existing arrangements.

Disclosed are arrangements, referred to as Variable Blend Width Compositing (VBWC) arrangements, which seek to address the above problems by generating a spatially variable width alpha matte which generates, in the processing of the image, a thin matte at a hard edge of the image, and a wide matte at a soft edge of the image, thus reducing the visibility of artefacts produced by imperfect depth maps used when applying bokeh processing to an image.

According to a first aspect of the present invention, there is provided a method of producing a rendered image with a blurred background from an initial image and a depth map of the image, said depth map identifying at least one foreground region and at least one background region of the image, said method comprising the steps of:
    determining an edge visibility measure for at least one edge in the depth map by comparing a parameter value associated with a pixel in the foreground region near the edge with a parameter value associated with another pixel in the background region near the edge, said edge visibility measure distinguishing between the foreground region and the background region;
    applying a spatially variable blur to the depth map to produce a compositing matte, wherein a size of a blur kernel used to form the spatially variable blur is dependent on the determined edge visibility measure;
    applying a blur to image data in at least one background region of the depth map to form blurred background image data; and
    compositing the blurred background image data with the initial image in a ratio defined by the compositing matte to produce the rendered image with the blurred background.

According to another aspect of the present invention, there is provided an apparatus for producing a rendered image with a blurred background from an initial image and a depth map of the image, said depth map identifying at least one foreground region and at least one background region of the image, said apparatus comprising:
    a processor; and
    a memory storing a non-transitory computer executable program for directing the processor to perform a method comprising the steps of:
    determining an edge visibility measure for at least one edge in the depth map by comparing a parameter value associated with a pixel in the foreground region near the edge with a parameter value associated with another pixel in the background region near the edge, said edge visibility measure distinguishing between the foreground region and the background region;
    applying a spatially variable blur to the depth map to produce a compositing matte, wherein a size of a blur kernel used to form the spatially variable blur is dependent on the determined edge visibility measure;
    applying a blur to image data in at least one background region of the depth map to form blurred background image data; and
    compositing the blurred background image data with the initial image in a ratio defined by the compositing matte to produce the rendered image with the blurred background.

According to another aspect of the present invention, there is provided a computer readable non-transitory storage medium storing a computer executable program for directing a processor to execute a method of producing a rendered image with a blurred background from an initial image and a depth map of the image, said depth map identifying at least one foreground region and at least one background region of the image, said method comprising the steps of:
    determining an edge visibility measure for at least one edge in the depth map by comparing a parameter value associated with a pixel in the foreground region near the edge with a parameter value associated with another pixel in the background region near the edge, said edge visibility measure distinguishing between the foreground region and the background region;
    applying a spatially variable blur to the depth map to produce a compositing matte, wherein a size of a blur kernel used to form the spatially variable blur is dependent on the determined edge visibility measure;
    applying a blur to image data in at least one background region of the depth map to form blurred background image data; and
    compositing the blurred background image data with the initial image in a ratio defined by the compositing matte to produce the rendered image with the blurred background.

According to another aspect of the present invention, there is provided a compositing matte which has had a spatially variable blur applied, said compositing matte comprising $\alpha$ opacity values that change from one to zero across a depth transition, wherein a width of the $\alpha$ values change is narrower for a hard edge and wider for a soft edge in the image.

Other aspects of the invention are also disclosed.

BRIEF DESCRIPTION OF THE DRAWINGS

One or more embodiments of the invention will now be described with reference to the following drawings, in which:

FIG. 2A illustrates in pictorial form a 3D scene comprising a foreground object and a textured background;

FIG. 2B illustrates in pictorial form two-layer depth map corresponding to the 3D scene of FIG. 2A. The depth map contains an error where a region of the background is marked as foreground;

FIG. 2C illustrates in pictorial form the result of applying defocus blur to the background of FIG. 2A according to the depth map in FIG. 2B;

DETAILED DESCRIPTION INCLUDING BEST MODE

Figure 1:
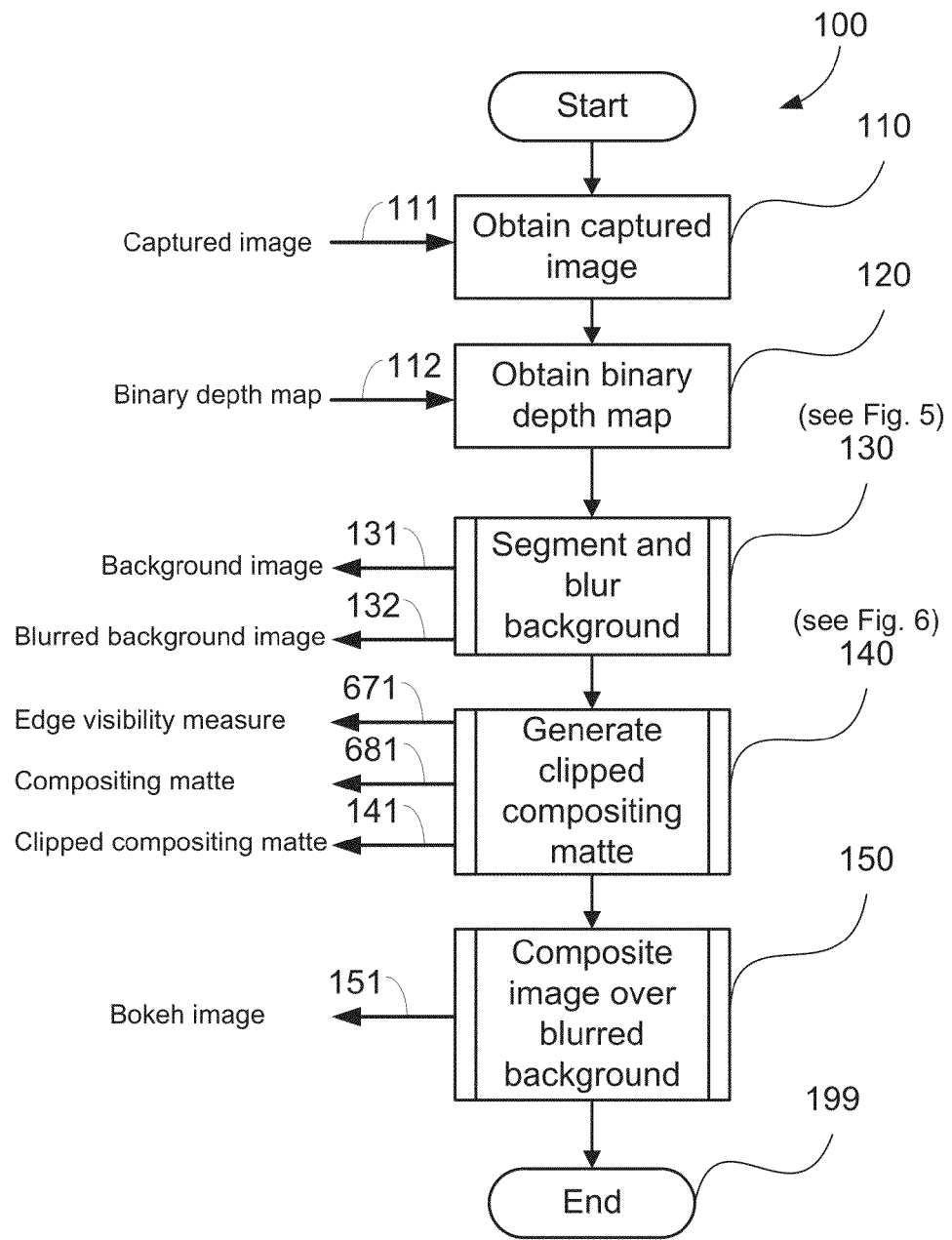
FIG. 1 is a schematic flow diagram illustrating a method of generating an image with bokeh blurring according to one VBWC arrangement.

Where reference is made in any one or more of the accompanying drawings to steps and/or features, which have the same reference numerals, those steps and/or features have for the purposes of this description the same function(s) or operation(s), unless the contrary intention appears.

It is to be noted that the discussions contained in the "Background" section and that above relating to prior art arrangements relate to discussions of documents or devices which form public knowledge through their respective publication and/or use. Such should not be interpreted as a representation by the present inventor(s) or the patent applicant that such documents or devices in any way form part of the common general knowledge in the art.

Context

An automated method of generating an improved compositing opacity matte which minimises the visibility of rendering artefacts for a depth map with errors is disclosed.

It is computationally expensive to achieve high quality bokeh rendering using a continuous depth map, as ray-tracing type approaches are typically needed to correctly simulate defocused image formation of a 3-D scene. By assigning scene objects to discrete depth layers, each image layer may be blurred independently using a spatially invariant blur algorithm, and the separately blurred layers combined to form the rendered image. Combining images from multiple layers may be achieved by compositing each blurred image layer in sequence. We therefore discuss methods of two-layer rendering with the understanding this may be extended to multiple depth layers.

The shape and intensity of the image formed on the camera sensor by a point source of light in the scene is known as the point spread function (PSF). For a circular lens aperture, the PSF will take the form of a disk. When performing bokeh rendering, a pillbox or top-hat blur kernel is appropriate when simulating the blur of a camera system.

Using a thin lens, ray-based optical model for image capture, the relationship between blur (PSF) diameter at a sensor c, and a depth $S_1$, is given by the following equation:

$$c = A \frac{|S_1 - S_2|}{S_1} \cdot \frac{f}{S_2 - f}. \quad (2)$$

Where all variables are lengths, having units of mm for example, and where A is the aperture diameter, f is the focal length of the lens, $S_1$ the distance between the lens and the layer containing the scene object centred at a current pixel location, and $S_2$ the distance between the lens and the scene focal plane. The increase in blur for bokeh rendering may be controlled by selecting an appropriate value for A for the simulated optical system.

A continuous or multi-valued depth map may be segmented into two layers by thresholding to create a binary mask. However, the background image obtained by applying this binary segmentation mask to the captured image does not contain sufficient information to correctly simulate the defocused background. This is known as the visibility problem as the defocussed background image produced by a large aperture camera may contain contributions from scene objects which are fully or partially obscured by foreground objects in the scene. One approach to addressing the visibility problem is to in-paint the obscured background pixels before blurring. In-painting methods use the colour and texture of visible pixels to estimate the respective colour and texture values of hidden pixels. However, in-painting techniques are generally computationally expensive and must deal with varying sizes of obscured regions. Alternatively, the segmented background image can be blurred directly with hidden pixels set to black (zero). The blurring process extends the spatial coverage of the background image pixels into the hidden region by a distance of up to the blur kernel radius. However, the hidden pixels which were set to black introduce a fall-off of intensity affecting a region the size of the blur kernel radius on either side of the segmented boundary. The intensity fall-off may be compensated for by dividing the affected image pixels by a normalisation factor. The required normalisation is obtained by applying the same blur to the binary segmentation mask. Division by zero may be avoided by setting zero valued pixels in the blurred mask to a value of one. This procedure results in a blurred background image with obscured pixels being assigned a value for a distance of the blur kernel radius into hidden regions.

When compositing, the pixel values should represent a linear intensity scale and we assume processing is performed on raw sensor data which has not had a tone or gamma mapping applied. If tone mapping has been applied, an inverse mapping should be applied before compositing.

Raw sensor data typically contains intensity data from the sensor covered with a colour filter array (CFA) according to a Bayer pattern. Compositing may be performed by rendering each of the four colour channels separately and re-multiplexing the rendered colour channels back to a raw image according to the CFA pattern. Standard camera raw image processes, such as de-mosaicking, white balancing and gamma mapping are then applied. When processing colour channels separately, the depth map and compositing matte should be the same resolution as the CFA to avoid the introduction of colour artifacts.

The compositing opacity matte may be obtained from a spatially accurate depth layer mask by blurring the mask with a kernel of the appropriate size. The kernel size is set by the corresponding size of the PSF of the depth layer nearer to the focal plane according to equation (2), including the contribution due to sensor pixel spatial quantisation.

Figure 4A:
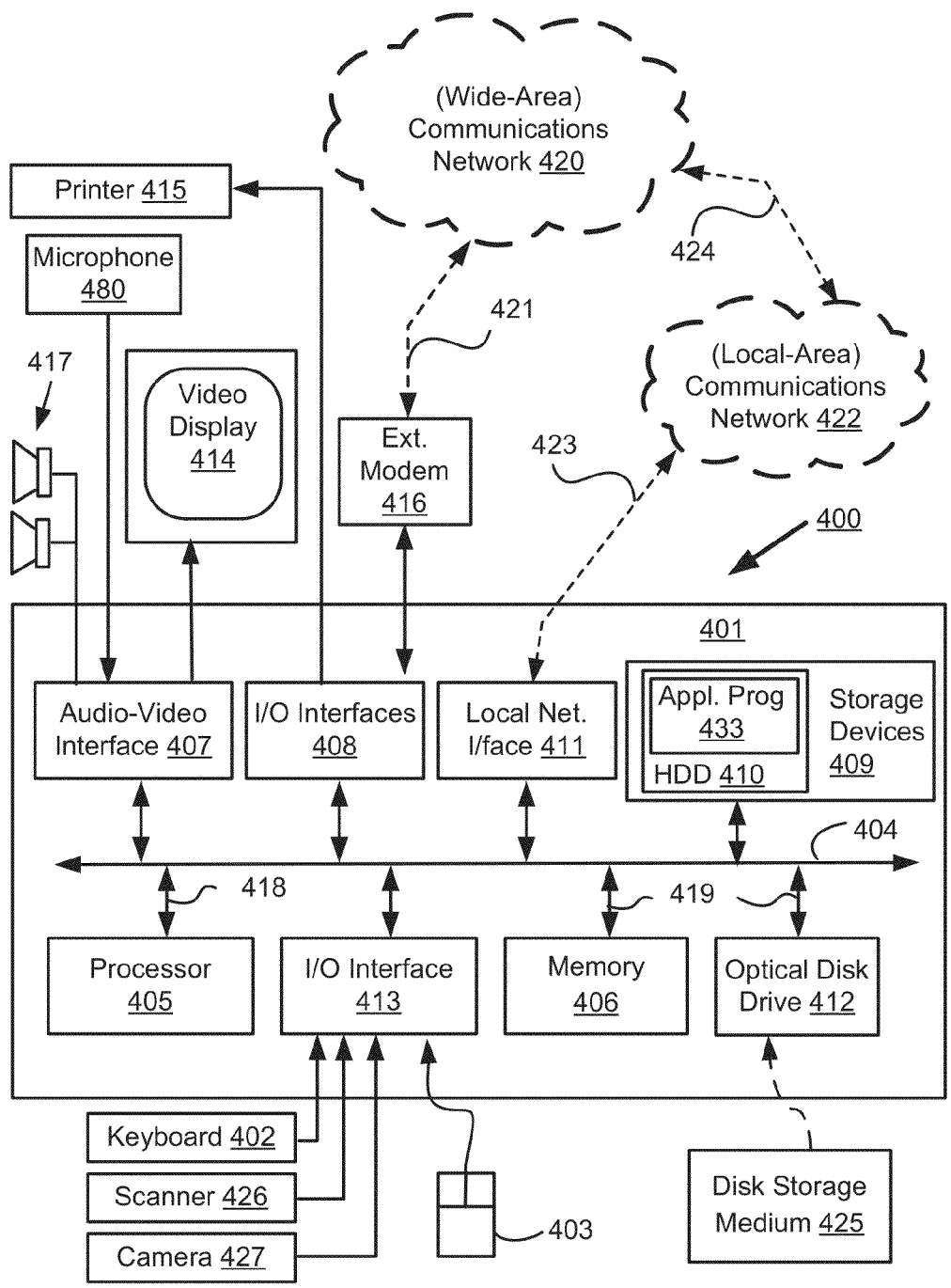
FIGS. 4A and 4B constitute a schematic block diagram of a general purpose computer on which the VBWC arrangement may be practiced.
Figure 4B:
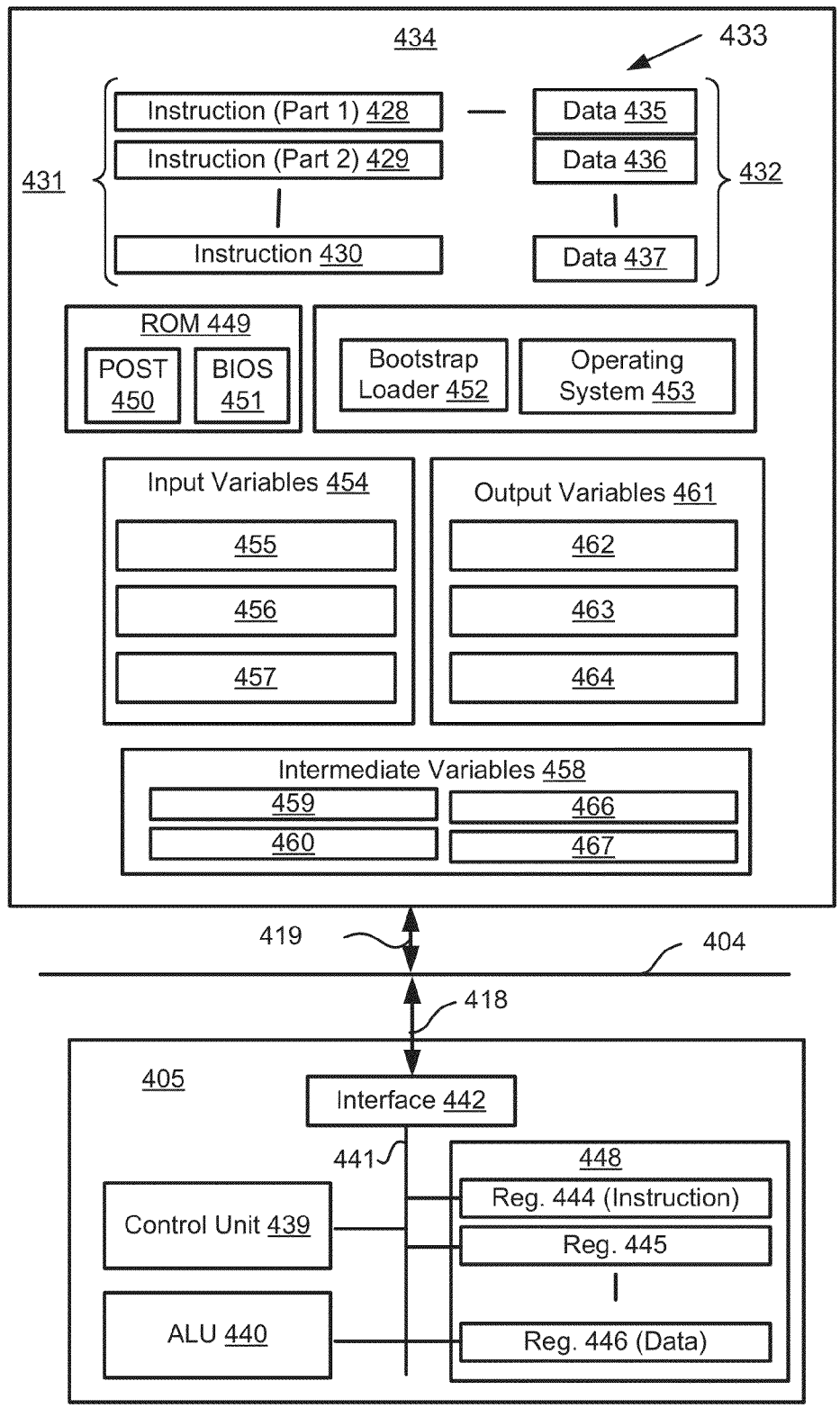

FIGS. 4A and 4B depict a general-purpose computer system 400, upon which the various VBWC arrangements described can be practiced.

As seen in FIG. 4A, the computer system 400 includes: a computer module 401; input devices such as a keyboard 402, a mouse pointer device 403, a scanner 426, a camera 427, and a microphone 480; and output devices including a printer 415, a display device 414 and loudspeakers 417. An external Modulator-Demodulator (Modem) transceiver device 416 may be used by the computer module 401 for communicating to and from a communications network 420 via a connection 421. The communications network 420 may be a wide-area network (WAN), such as the Internet, a cellular telecommunications network, or a private WAN. Where the connection 421 is a telephone line, the modem 416 may be a traditional "dial-up" modem. Alternatively, where the connection 421 is a high capacity (e.g., cable) connection, the modem 416 may be a broadband modem. A wireless modem may also be used for wireless connection to the communications network 420.

The computer module 401 typically includes at least one processor unit 405, and a memory unit 406. For example, the memory unit 406 may have semiconductor random access memory (RAM) and semiconductor read only memory (ROM). The computer module 401 also includes an number of input/output (I/O) interfaces including: an audio-video interface 407 that couples to the video display 414, loudspeakers 417 and microphone 480; an I/O interface 413 that couples to the keyboard 402, mouse 403, scanner 426, camera 427 and optionally a joystick or other human interface device (not illustrated); and an interface 408 for the external modem 416 and printer 415. In some implementations, the modem 416 may be incorporated within the computer module 401, for example within the interface 408. The computer module 401 also has a local network interface 411, which permits coupling of the computer system 400 via a connection 423 to a local-area communications network 422, known as a Local Area Network (LAN). As illustrated in FIG. 4A, the local communications network 422 may also couple to the wide network 420 via a connection 424, which would typically include a so-called "firewall" device or device of similar functionality. The local network interface 411 may comprise an Ethernet circuit card, a Bluetooth® wireless arrangement or an IEEE 802.11 wireless arrangement; however, numerous other types of interfaces may be practiced for the interface 411.

The I/O interfaces 408 and 413 may afford either or both of serial and parallel connectivity, the former typically being implemented according to the Universal Serial Bus (USB) standards and having corresponding USB connectors (not illustrated). Storage devices 409 are provided and typically include a hard disk drive (HDD) 410. Other storage devices such as a floppy disk drive and a magnetic tape drive (not illustrated) may also be used. An optical disk drive 412 is typically provided to act as a non-volatile source of data. Portable memory devices, such optical disks (e.g., CD-ROM, DVD, Blu ray Disc™), USB-RAM, portable, external hard drives, and floppy disks, for example, may be used as appropriate sources of data to the system 400.

The components 405 to 413 of the computer module 401 typically communicate via an interconnected bus 404 and in a manner that results in a conventional mode of operation of the computer system 400 known to those in the relevant art. For example, the processor 405 is coupled to the system bus 404 using a connection 418. Likewise, the memory 406 and optical disk drive 412 are coupled to the system bus 404 by connections 419. Examples of computers on which the described arrangements can be practiced include IBM-PC's and compatibles, Sun Sparcstations, Apple Mac™ or a like computer systems.

The VBWC method may be implemented using the computer system 400 wherein the processes of FIGS. 1, 5, 6, 8, 9 and 12, to be described, may be implemented as one or more software application programs 433 executable within the computer system 400. In particular, the steps of the VBWC method are effected by instructions 431 (see FIG. 4B) in the software 433 that are carried out within the computer system 400. The software instructions 431 may be formed as one or more code modules, each for performing one or more particular tasks. The software may also be divided into two separate parts, in which a first part and the corresponding code modules performs the VBWC methods and a second part and the corresponding code modules manage a user interface between the first part and the user.

The software may be stored in a computer readable medium, including the storage devices described below, for example. The software is loaded into the computer system 400 from the computer readable medium, and then executed by the computer system 400. A computer readable medium having such software or computer program recorded on the computer readable medium is a computer program product. The use of the computer program product in the computer system 400 preferably effects an advantageous VBWC apparatus.

The software 433 is typically stored in the HDD 410 or the memory 406. The software is loaded into the computer system 400 from a computer readable medium, and executed by the computer system 400. Thus, for example, the software 433 may be stored on an optically readable disk storage medium (e.g., CD-ROM) 425 that is read by the optical disk drive 412. A computer readable medium having such software or computer program recorded on it is a computer program product. The use of the computer program product in the computer system 400 preferably effects an apparatus for performing the VBWC method.

In some instances, the application programs 433 may be supplied to the user encoded on one or more CD-ROMs 425 and read via the corresponding drive 412, or alternatively may be read by the user from the networks 420 or 422. Still further, the software can also be loaded into the computer system 400 from other computer readable media. Computer readable storage media refers to any non-transitory tangible storage medium that provides recorded instructions and/or data to the computer system 400 for execution and/or processing. Examples of such storage media include floppy disks, magnetic tape, CD-ROM, DVD, Blu-ray™ Disc, a hard disk drive, a ROM or integrated circuit, USB memory, a magneto-optical disk, or a computer readable card such as a PCMCIA card and the like, whether or not such devices are internal or external of the computer module 401. Examples of transitory or non-tangible computer readable transmission media that may also participate in the provision of software, application programs, instructions and/or data to the computer module 401 include radio or infra-red transmission channels as well as a network connection to another computer or networked device, and the Internet or Intranets including e-mail transmissions and information recorded on Websites and the like.

The second part of the application programs 433 and the corresponding code modules mentioned above may be executed to implement one or more graphical user interfaces (GUIs) to be rendered or otherwise represented upon the display 414. Through manipulation of typically the keyboard 402 and the mouse 403, a user of the computer system 400 and the application may manipulate the interface in a functionally adaptable manner to provide controlling commands and/or input to the applications associated with the GUI(s). Other forms of functionally adaptable user interfaces may also be implemented, such as an audio interface utilizing speech prompts output via the loudspeakers 417 and user voice commands input via the microphone 480.

FIG. 4B is a detailed schematic block diagram of the processor 405 and a "memory" 434. The memory 434 represents a logical aggregation of all the memory modules (including the HDD 409 and semiconductor memory 406) that can be accessed by the computer module 401 in FIG. 4A.

When the computer module 401 is initially powered up, a power-on self-test (POST) program 450 executes. The POST program 450 is typically stored in a ROM 449 of the semiconductor memory 406 of FIG. 4A. A hardware device such as the ROM 449 storing software is sometimes referred to as firmware. The POST program 450 examines hardware within the computer module 401 to ensure proper functioning and typically checks the processor 405, the memory 434 (409, 406), and a basic input-output systems software (BIOS) module 451, also typically stored in the ROM 449, for correct operation. Once the POST program 450 has run successfully, the BIOS 451 activates the hard disk drive 410 of FIG. 4A. Activation of the hard disk drive 410 causes a bootstrap loader program 452 that is resident on the hard disk drive 410 to execute via the processor 405. This loads an operating system 453 into the RAM memory 406, upon which the operating system 453 commences operation. The operating system 453 is a system level application, executable by the processor 405, to fulfil various high level functions, including processor management, memory management, device management, storage management, software application interface, and generic user interface.

The operating system 453 manages the memory 434 (409, 406) to ensure that each process or application running on the computer module 401 has sufficient memory in which to execute without colliding with memory allocated to another process. Furthermore, the different types of memory available in the system 400 of FIG. 4A must be used properly so that each process can run effectively. Accordingly, the aggregated memory 434 is not intended to illustrate how particular segments of memory are allocated (unless otherwise stated), but rather to provide a general view of the memory accessible by the computer system 400 and how such is used.

As shown in FIG. 4B, the processor 405 includes a number of functional modules including a control unit 439, an arithmetic logic unit (ALU) 440, and a local or internal memory 448, sometimes called a cache memory. The cache memory 448 typically include a number of storage registers 444-446 in a register section. One or more internal busses 441 functionally interconnect these functional modules. The processor 405 typically also has one or more interfaces 442 for communicating with external devices via the system bus 404, using a connection 418. The memory 434 is coupled to the bus 404 using a connection 419.

The application program 433 includes a sequence of instructions 431 that may include conditional branch and loop instructions. The program 433 may also include data 432 which is used in execution of the program 433. The instructions 431 and the data 432 are stored in memory locations 428, 429, 430 and 435, 436, 437, respectively. Depending upon the relative size of the instructions 431 and the memory locations 428-430, a particular instruction may be stored in a single memory location as depicted by the instruction shown in the memory location 430. Alternately, an instruction may be segmented into a number of parts each of which is stored in a separate memory location, as depicted by the instruction segments shown in the memory locations 428 and 429.

In general, the processor 405 is given a set of instructions which are executed therein. The processor 1105 waits for a subsequent input, to which the processor 405 reacts to by executing another set of instructions. Each input may be provided from one or more of a number of sources, including data generated by one or more of the input devices 402, 403, data received from an external source across one of the networks 420, 402, data retrieved from one of the storage devices 406, 409 or data retrieved from a storage medium 425 inserted into the corresponding reader 412, all depicted in FIG. 4A. The execution of a set of the instructions may in some cases result in output of data. Execution may also involve storing data or variables to the memory 434.

The disclosed VBWC arrangements use input variables 454, which are stored in the memory 434 in corresponding memory locations 455, 456, 457. The VBWC arrangements produce output variables 461, which are stored in the memory 434 in corresponding memory locations 462, 463, 464. Intermediate variables 458 may be stored in memory locations 459, 460, 466 and 467.

Referring to the processor 405 of FIG. 4B, the registers 444, 445, 446, the arithmetic logic unit (ALU) 440, and the control unit 439 work together to perform sequences of micro-operations needed to perform "fetch, decode, and execute" cycles for every instruction in the instruction set making up the program 433. Each fetch, decode, and execute cycle comprises:

a fetch operation, which fetches or reads an instruction 431 from a memory location 428, 429, 430;

[a decode operation in which the control unit 439 determines which instruction has been fetched; and an execute operation in which the control unit 439 and/or the ALU 440 execute the instruction.

Thereafter, a further fetch, decode, and execute cycle for the next instruction may be executed. Similarly, a store cycle may be performed by which the control unit 439 stores or writes a value to a memory location 432.

Each step or sub-process in the processes of FIGS. 1, 5, 6, 8, 9 and 12 is associated with one or more segments of the program 433 and is performed by the register section 444, 445, 447, the ALU 440, and the control unit 439 in the processor 405 working together to perform the fetch, decode, and execute cycles for every instruction in the instruction set for the noted segments of the program 433.

The VBWC method may alternatively be implemented in dedicated hardware such as one or more integrated circuits performing the VBWC functions or sub functions. Such dedicated hardware may include graphic processors, digital signal processors, or one or more microprocessors and associated memories.

The schematic flow diagram in FIG. 1 shows the main steps of two-layer bokeh rendering process 100.

At a step 110, performed by the processor 405 as directed by the program 433, a captured image 111 (also referred to as an initial image) with large depth of field (see 1301 in FIG. 13) is obtained. A corresponding binary depth map 112 is obtained (see 1302 in FIG. 13) at a following step 120. The depth map is useful in identifying between foreground and background of the image. The depth map 112 depicts at least one edge of the image 111. At a following step 130, performed by the processor 405 as directed by the program 433, the binary depth map 112 is used to select background pixels in the image 111 obtained in the step 110 to form a background image 131. The binary depth map 112 identifies at least one foreground region 215 and at least one background region 220 (see FIG. 2A) in the image 111. The selected background pixels (i.e. the background image 131) are blurred using a spatially invariant filter to form a blurred background image 132 (also referred to as a noise-restored normalized blurred background image). At a following step 140, performed by the processor 405 as directed by the program 433, a clipped compositing matte 141 based on the binary depth map 112 is generated (see 1304 in FIG. 13). The purpose of the clipped compositing matte 141 is to avoid an unnaturally sharp transition between the sharp foreground and the blurred background. Alternately, the step 140 may ensure that the width of the compositing matte is less than a particular value in a manner other than by clipping, such as by interpolating. At a following step 150, performed by the processor 405 as directed by the program 433, the original image 111 is composited over the blurred background image 132 using the clipped compositing matte 141 as explained above to form a composited image 151, also referred to as a rendered image with a blurred background or a bokeh image (see 1305 in FIG. 13).

FIG. 2A illustrates a scene with a foreground object 215 and a background 220. At least one edge 231 of the object 215 is depicted as a corresponding edge 232 in a two layer binary depth map 230. An enlarged inset 238 from FIG. 2A depicts a pixel 233 in a foreground region 236 near the edge 231. FIG. 2A depicts also another pixel 234 in a background region 237 near the edge 231.

FIG. 2B illustrates the two-layer depth map 230 associated with the image 210. Regions 235 and 240 have been designated as foreground, and a region 245 has been designated as background. In this example, the region 240 has incorrectly been identified as foreground, although this error is not known to the system.

FIG. 2C illustrates the result of applying the bokeh rendering steps of FIG. 1. A rendered image 250 has a sharp foreground region 255 corresponding to the region 215 in FIG. 2A. A background 260 is blurred for the region of the image identified as background in FIG. 2B (ie 245). However, the background 260 has been rendered without blur in the region 265 corresponding to the depth map error 240 in FIG. 2B.

Overview of the VBWC Arrangement

The VBWC arrangement relates to the step 140 in FIG. 1 of automatically generating a compositing matte which reduces the visual impact of artefacts caused by depth map errors whilst maintaining high image quality in regions without depth map errors. The VBWC arrangement has the advantages over the prior art of requiring no manual intervention, and providing an aesthetically superior appearance in the rendered image.

When part of a region with low texture is assigned to the foreground and an adjacent section is assigned to the background, an observer may not be able to detect if a region has been incorrectly blurred or not. However, an abrupt transition between the two rendered regions is visible due to a change in intensity or colour. This abrupt transition is due to the corresponding transition between foreground and background in the compositing opacity matte. By increasing the width of the transition, the observer is less able to discern incorrect application of bokeh rendering due to the depth map error. However, in regions of strong texture, accurate depth transitions should result in a corresponding narrow transition in the compositing opacity matte to avoid soft edges or ghosting artefacts.

Figure 3A:
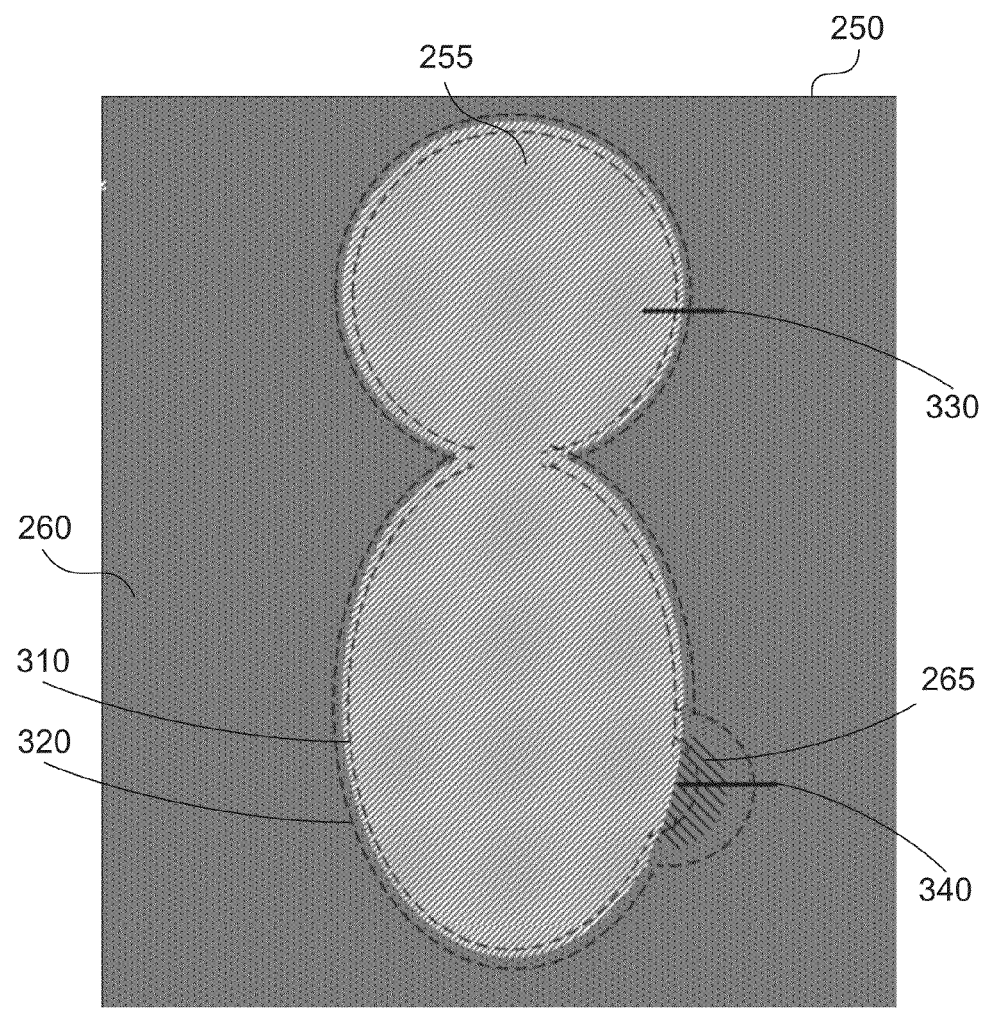
FIG. 3A indicates in pictorial form the extent of fractional alpha values in a compositing matte.
Figure 3B:
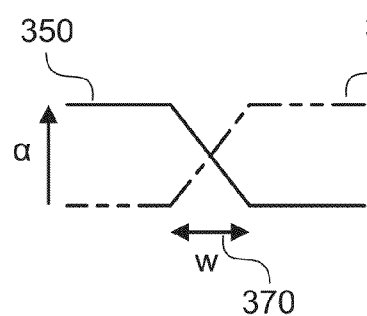
FIGS. 3B and C illustrate in pictorial form a cross section through two compositing mattes of different widths.
Figure 3C:
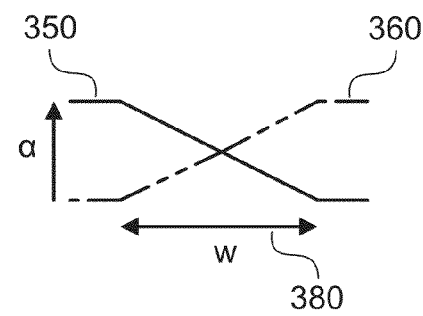

FIG. 3A shows the result of bokeh rendering as in FIG. 2C. The range of pixels which have been composited using a fractional alpha value is indicated by dashed lines 310 and 320. A cross section 330 through the clipped compositing matte 141 for one region is illustrated in FIG. 3B. A pictorial example of this cross section is depicted at 1308 in FIG. 13 which depicts a thin matte at a hard edge. A cross section 340 through the clipped compositing matte 141 for a second region is illustrated in FIG. 3C. A pictorial example of this cross section is depicted at 1307 in FIG. 13 which depicts a wide matte at a soft edge.

FIG. 3B shows a cross section representing the opacity value α across the depth transition (also referred to as a depth change) 330 between foreground and blurred background in the bokeh image. The value of α designated 350 is a value within the foreground object, and α transitions to zero over the range of several pixels 370 into the blurred background part of the image. This reflects the amount that each foreground pixel contributes to the final image. The line 360 indicates the value of (1−α) which reflects the amount that each background pixel contributes to the final image.

FIG. 3C illustrates a case where the transition of alpha values from one to zero is wider (indicating a soft edge) than for FIG. 3B where a narrower transition (indicating a hard edge) is depicted.

VBWC Arrangement 1

Figure 5:
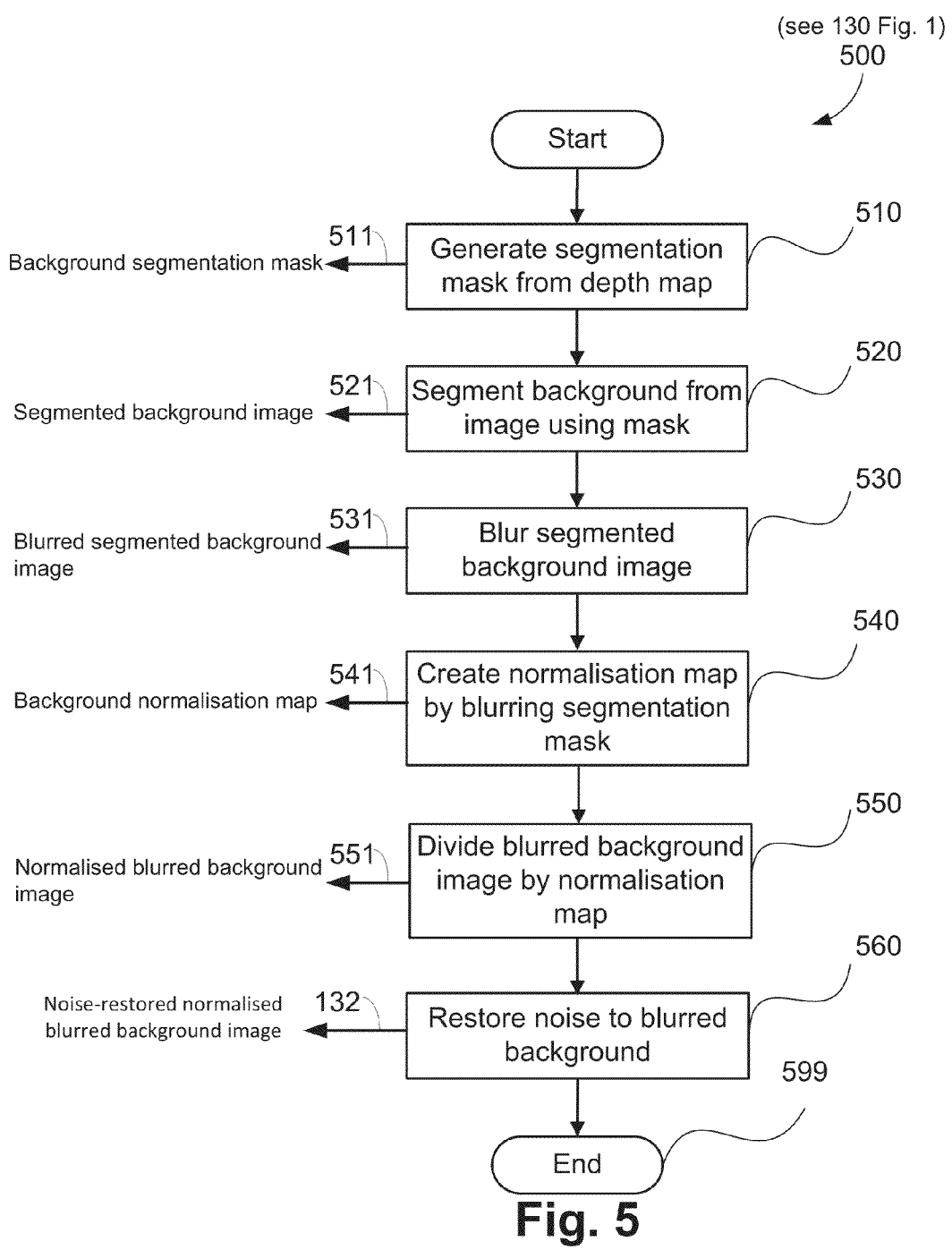
FIG. 5 is a schematic flow diagram illustrating a method of segmenting and blurring the background as used in the method of FIG. 1.

FIG. 5 is a schematic flow diagram illustrating a method of segmenting and blurring the background as used in the step 130 the method of FIG. 1. In a step 510, performed by the processor 405 as directed by the program 433, the binary depth map 112 is used to create a binary background segmentation mask 511. Depth map locations in the foreground of the binary depth map 112 are set to a value of zero in the background segmentation mask 511 and depth map locations in the background of the binary depth map 112 set to one in the background segmentation mask 511. At a following step 520, performed by the processor 405 as directed by the program 433, pixels in the captured image 111 where the corresponding values in the background segmentation mask 511 are equal to one are copied to a new image termed a segmented background image 521. Locations in the segmented background image 521 where the corresponding values in the binary background segmentation mask 511 is zero are set to a pixel value of zero.

At a following step 530, performed by the processor 405 as directed by the program 433, the segmented background image 521 is blurred by applying a spatially invariant convolution with a suitable kernel to image data in the segmented background image 521 to form a blurred segmented background image 531. Although a spatially invariant blur is applied in the present example, any blur can be used. A pillbox kernel is preferred as this is close to the typical defocus optical PSF in a camera, although blur algorithm efficiencies may be gained by using a Gaussian kernel due to separability. Other kernels may be used based on the desired visual bokeh characteristics. The radius of the kernel depends on the desired degree of defocus to be simulated by the bokeh rendering process, and the radius of the kernel may be predetermined or supplied as an input to the system. The intensity of pixels in the blurred segmented background image 531 near the segmentation boundary is reduced due to the spread of zero valued (black) pixels into the segmented background region caused by the blurring process. The intensity of these pixels is corrected in following steps 540 and 550.

In a following step 540, performed by the processor 405 as directed by the program 433, the binary background segmentation mask 511 is blurred to form a background normalisation map 541, using the same method and kernel size applied to blur the segmented background image 521. Locations in the background normalisation map with a value of zero are set to one to avoid division by zero in a following step 550. In the following step 550, performed by the processor 405 as directed by the program 433, each pixel in the blurred segmented background image 531 is divided by the corresponding value in the background normalisation map 541 for the corresponding location to form a normalized blurred background image 551.

Blurring the segmented background image 521 to form the blurred segmented background image 531 reduces the noise which is naturally present in the captured image 111. Since the foreground is not blurred, noise will remain in the foreground image following compositing. To avoid this visible difference in image quality, noise is added to the normalized blurred background image 551 in a following step 560, performed by the processor 405 as directed by the program 433, to form the noise-restored normalized blurred background image 132 which is the blurred background image produced by the step 130 in FIG. 1. The dominant noise source in modern CMOS sensors is Poisson or shot noise. The amount of noise to be added in the step 560 is signal dependent, and can be determined by taking into account the full well capacity or other attributes of the sensor.

Figure 6:
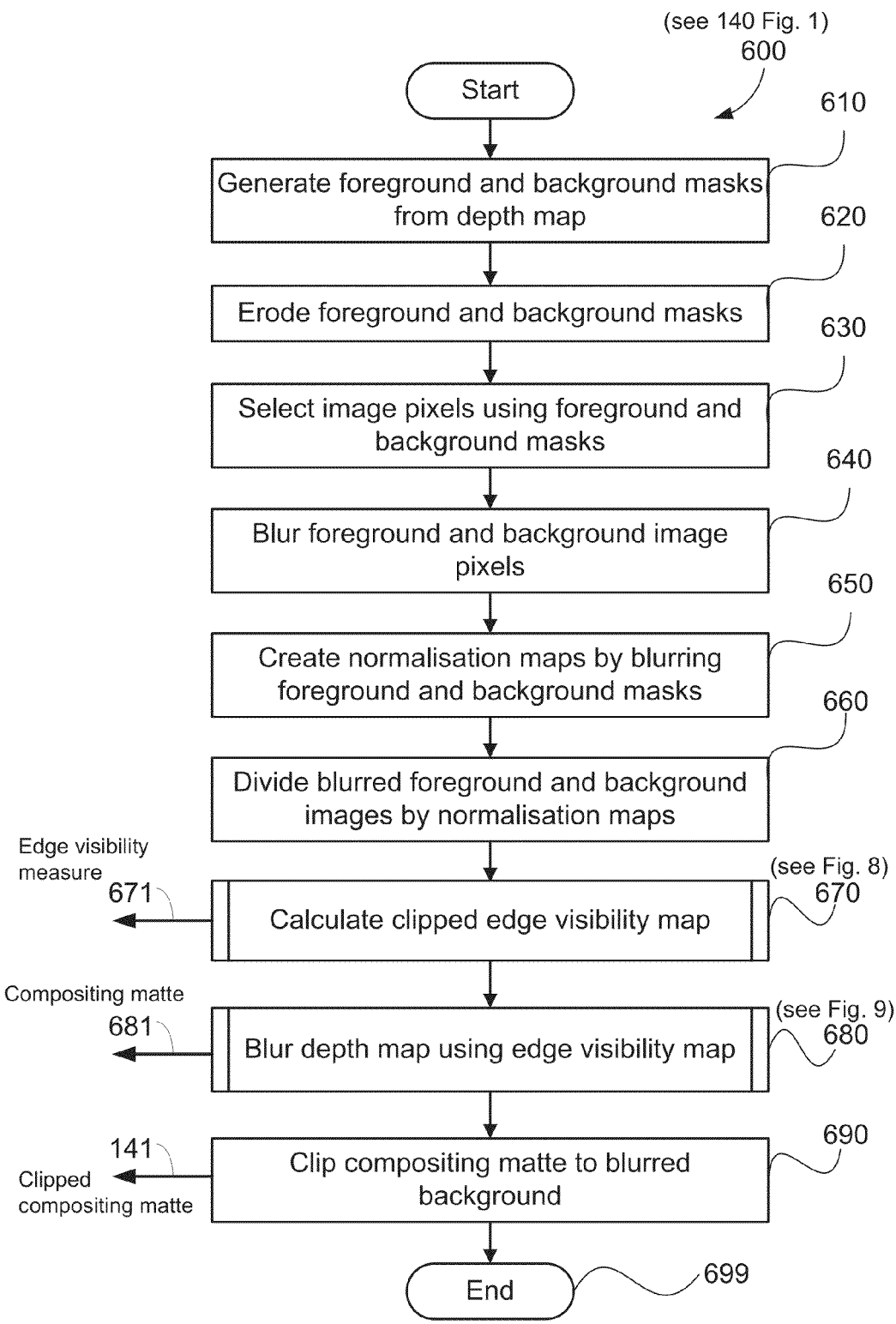
FIG. 6 is a schematic flow diagram illustrating a method of generating a compositing matte as used in the method of FIG. 1.

FIG. 6 is a schematic flow diagram illustrating a method of generating a compositing matte as used in the step 140 of the method of FIG. 1. In a step 610, performed by the processor 405 as directed by the program 433, the binary depth map 112 is used to create two masks, namely a background mask 611 and a foreground mask 612. Locations (ie pixels) in the foreground of the binary depth map 112 are set to a value of zero in the background mask 611 and to a value of one in the foreground mask 612. Locations (ie pixels) in the background of the binary depth map 112 are set to a value of one in the background mask 611 and to a value of zero in the foreground mask 612.

In a following step 620, performed by the processor 405 as directed by the program 433, morphological erosion is applied to both the foreground mask 612 and the background mask 611 to form an eroded foreground mask 621 and an eroded background mask 622 respectively. A typical erosion value is 3 pixels. In a following step 630, the eroded foreground mask 621 is used to select foreground pixels in the image 111. The captured image, 111 is copied to a new image termed the segmented foreground image 631. Locations (ie pixels) in the segmented foreground image 631 where the corresponding pixels in the eroded foreground mask 621 are zero are set to zero.

Also in step 630, performed by the processor 405 as directed by the program 433, the eroded background mask 622 is used to select background pixels in the image 111. The capture image 111 is copied to a new image termed a segmented background image 632. Locations in the segmented background image 632 where the corresponding values of the eroded background mask 622 are zero are set to zero in the segmented background image 632.

In a following step 640, performed by the processor 405 as directed by the program 433, the segmented foreground image 631 and the segmented background image 632 are blurred by applying a spatially invariant convolution with a pillbox or other kernel to each image to form a blurred segmented foreground image 641 and a blurred segmented background image 642 respectively. A typical blur kernel radius is 5 pixels.

The intensity of these pixels is corrected in steps 650 and 660.

In a following step 650, performed by the processor 405 as directed by the program 433, the foreground mask 612 is blurred to form a blurred foreground mask 653 using the same method and kernel size applied to blur the segmented foreground image 631. The blurred foreground mask is copied to a foreground normalisation map 651. Locations in the foreground normalisation map 651 with a value of zero are set to one to avoid division by zero in a following step 660. A blurred background mask 654 and background normalisation map 652 is created in an analogous way by blurring the background mask 611 using the same method and kernel size applied to blur the segmented background image 632.

In a following step 660, performed by the processor 405 as directed by the program 433, each pixel in the blurred segmented foreground image 641 is divided by the value in the foreground normalisation map 651 for the corresponding location to form a normalized blurred segmented foreground image 661. Similarly, the blurred segmented background image 642 is divided by the background normalisation map 652 to form a normalized blurred segmented background image 662.

In a following step 670, performed by the processor 405 as directed by the program 433, a clipped edge visibility map 671 (also referred to as an edge visibility measure) is determined using the normalized blurred segmented foreground and background images 661, 662 respectively (described hereinafter in more detail in regard to FIG. 8). The clipped edge visibility map (ie the visibility measure) is a measure of a contrast between adjacent regions of pixels marked as foreground and background. In a following step 680 a compositing matte 681 is generated by applying spatially variable blur to the binary depth map 112 using the clipped edge visibility map 671 (described hereinafter in more detail in regard to FIG. 9).

Steps 670 and 680 will be described in detail in relation to FIGS. 8 and 9.

The normalized blurred background image 551 formed at the step 550 has limited spatial extent. This is also true of the noise-restored normalized blurred background image 132 formed at the step 560. Pixels have valid values for the background region and a band extending a short distance into the foreground region, where the foreground and background regions are determined by the depth map 112. Pixel values in the foreground region of 551 and 132 outside this band will have a value of zero. The spatial extent of the band is equal to the radius of the blur kernel applied in the step 530. The radius of the blur kernel is determined as half the width of the blur kernel for a circular symmetric filter. To ensure the compositing stage only uses valid pixels from the noise-restored normalized blurred background image 132, the compositing matte should not have alpha values less than one outside the valid region of 132. The preferred VBWC arrangement achieves this in the following step 690.

In the step 690, performed by the processor 405 as directed by the program 433, the compositing matte 681 is clipped to form the clipped compositing matte 141 (see 1304 in FIG. 13) to ensure alpha values less than one are not present for pixels which are outside the noise-restored normalized blurred background image 132 generated in the step 560 in FIG. 5. Clipping is performed by selecting pixels with a value of zero in the blurred background mask 654 generated in the step 650. The corresponding selected pixels in the compositing matte 681 are set to a value of one to form the clipped compositing matte 141. As clipping may introduce a discontinuity in the clipped compositing matte 141, smoothing may be applied to nearby fractional alpha values in the matte to reduce the impact of clipping.

Figure 7:
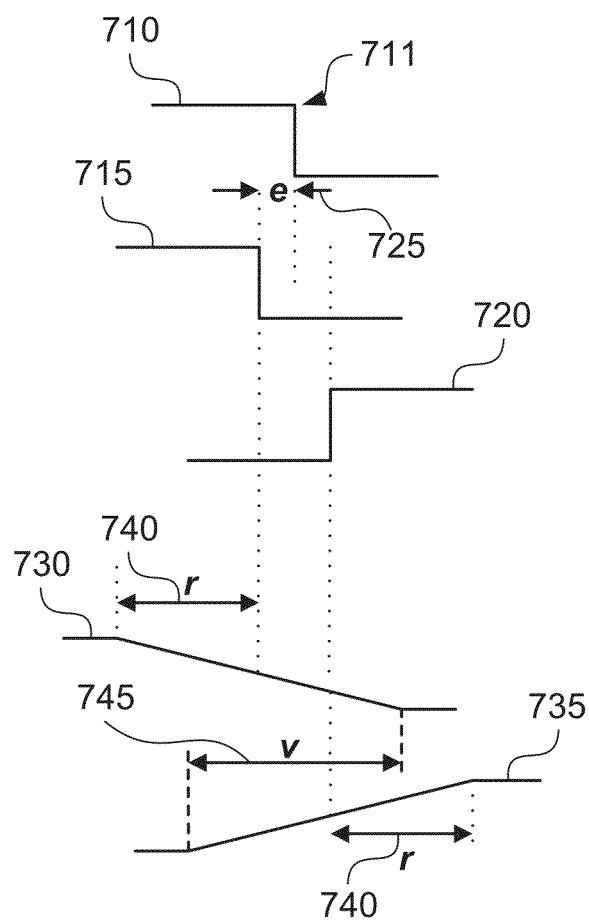
FIG. 7 illustrates in pictorial form some of the steps of generating a compositing matte shown in FIG. 6.

FIG. 7 illustrates in pictorial form some of the steps of generating the clipped edge visibility map 671 shown in FIG. 6. A cross section 710 through the binary depth map 112 is shown at a depth transition 711. Following the step 620, a cross section of the eroded foreground mask 621, as depicted at 715, can be seen to contain a transition which is offset from the depth transition 711 by the erosion value, e (ie 725). Similarly, a cross section of the eroded background mask 622, as depicted at 720, can be seen to contain a transition which is offset from the depth transition 711 in the opposite direction by the same erosion value 725. The blurred foreground mask is depicted at 730, displaying a ramp of values between zero and one produced by the blurring effect. The ramp width of this cross section is twice the blur kernel radius r (ie 740). Similarly, the blurred background mask is depicted at 735. Again the ramp width is twice the blur kernel radius, r. The amount of overlap v (ie 745), between these ramps determines the overlap mask discussed in the following paragraph.

Figure 8:
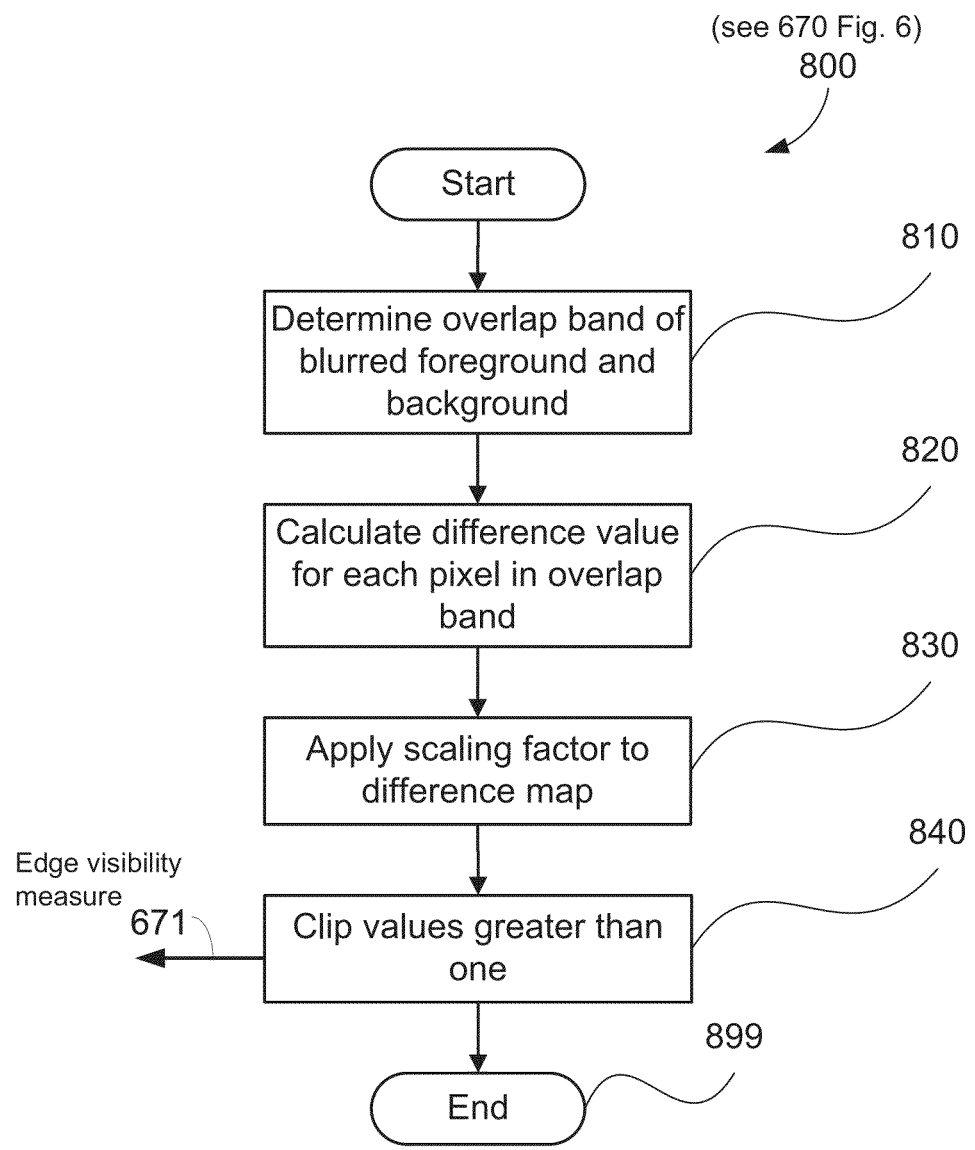
FIG. 8 is a schematic flow diagram illustrating a method of calculating an edge visibility map as used in the method of FIG. 6.

FIG. 8 is a schematic flow diagram illustrating a method of calculating an edge visibility map as used in the step 670 in the method of FIG. 6. In a step 810, performed by the processor 405 as directed by the program 433, a region of overlap (ie the overlap band) between the blurred foreground mask 653 and the blurred background mask 654 generated in step 650 is determined as follows. An overlap mask 811 is set to one for each location (ie pixel) that has non-zero values for both the blurred foreground mask 653 and the blurred background mask 654. The remainder of the overlap mask 811 is set to zero. In a following step 820, performed by the processor 405 as directed by the program 433, a colour difference value d is calculated for each non-zero location in the overlap mask 811 forming a colour difference map 821. Each colour difference value is obtained by subtracting, in quadrature, the colour pixel values in the blurred segmented background image 642 from the corresponding colour pixel values in the blurred segmented foreground image 641. Other comparison methods can be used instead of the colour difference approach. Thus for example, an average, or other statistical measure, of colour values of a plurality of pixels can be used. The preferred colour space is LAB, and if the captured image 111 is in a different colour space such as RGB, the image 111 is converted to LAB colour space in order to perform the VBWC method. The difference between the foreground and background blurred image pixel values for each colour space channel is squared. These squared values are summed for each of the three colour channels and the square root taken as follows:

$$d(x, y) = \sqrt{\sum_{c=Lab} (fg_c(x, y) - bg_c(x, y))^2}$$

Where $fg_c(x, y)$ are the values of the colour components of each LAB channel for the pixels in the overlap band in the blurred foreground image and $bg_c(x, y)$ are the values of the colour components of each LAB channel for the pixels in the overlap band in the blurred background image.

Figure 13:
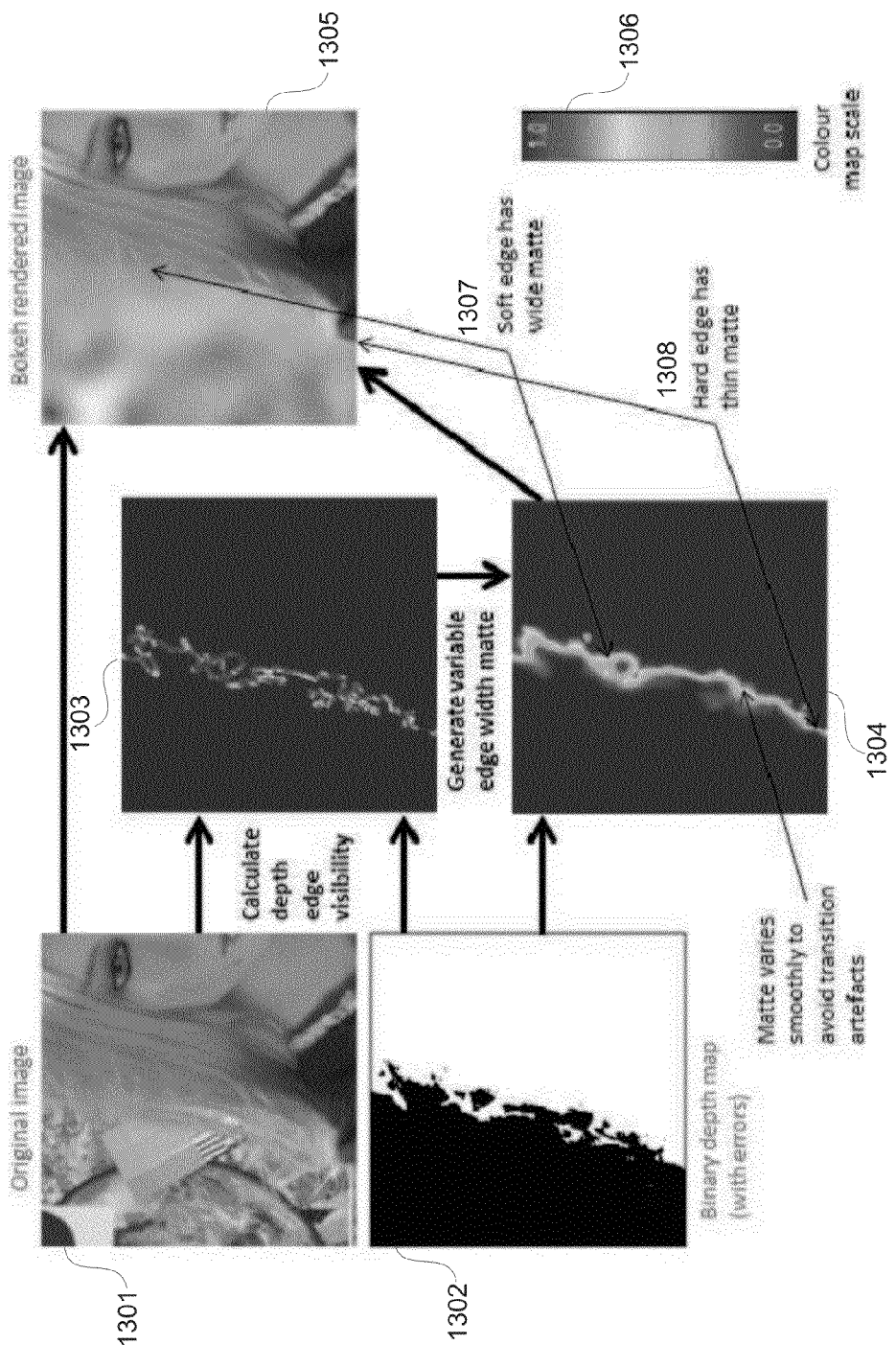
FIG. 13 depicts various stages of the VBWC method.

In a following step 830, performed by the processor 405 as directed by the program 433, the colour difference values in the colour difference map 821 calculated in step 820 are multiplied by a scaling factor sf to obtain an edge visibility map ev_map (ie 831; also see 1303 in FIG. 13). The preferred scaling factor is three. In a following step 840, performed by the processor 405 as directed by the program 433, any values in the edge visibility map 831 which are greater than one are clipped to form a clipped edge visibility map 671, also referred to as an edge visibility measure, as follows:

ev_map(x,y)=min(1,sf·d(x,y))

The clipped edge visibility map ev_map has values in the range 0 to 1. Alternative methods may be used to generate the clipped edge visibility map 671 described in steps 820, 830 and 840. Examples include the use of Bayesian information criterion to model colour difference or the use of texture information.

Figure 9:
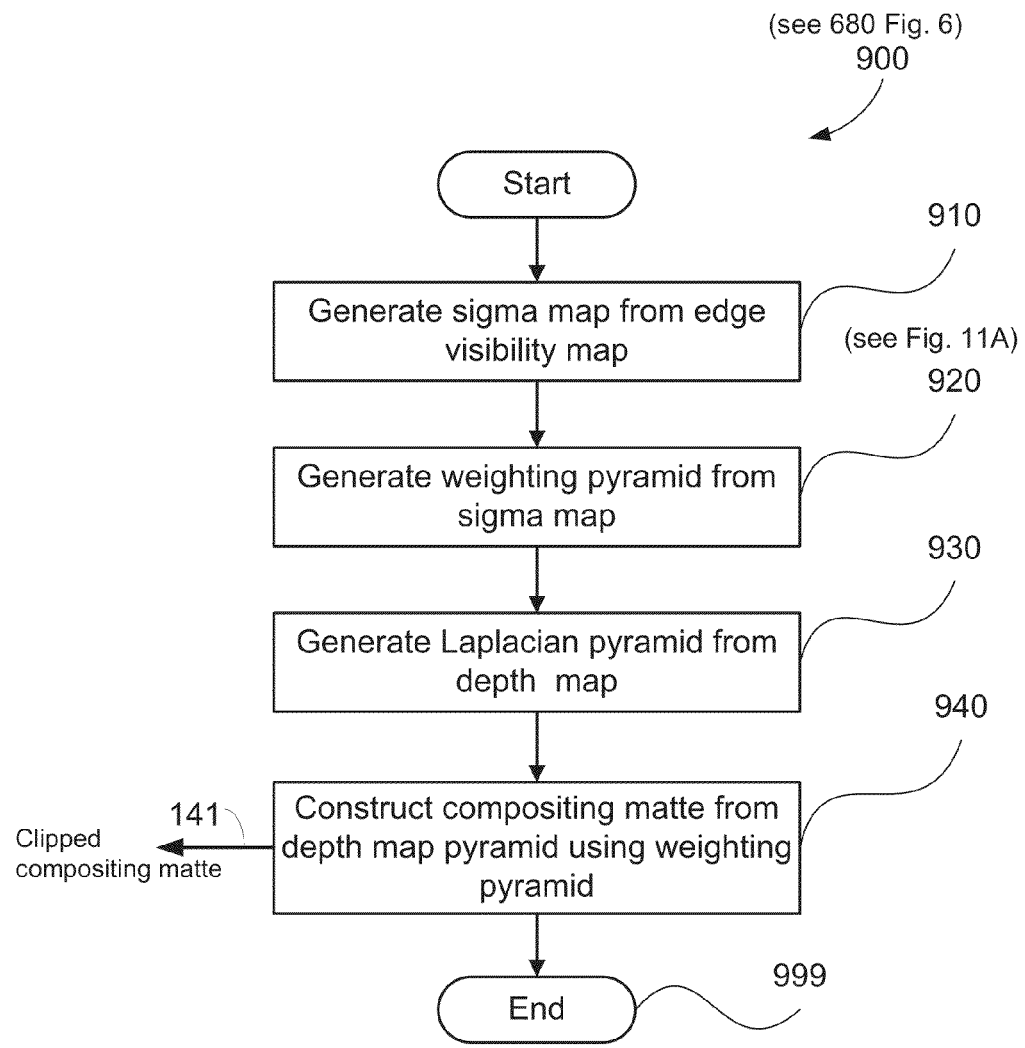
FIG. 9 is a schematic flow diagram illustrating a method of blurring a depth map using an edge visibility map as used in the method of FIG. 6.

FIG. 9 is a schematic flow diagram illustrating a method of blurring a depth map using the clipped edge visibility map 671 by applying spatially variable blur as used in step 680 in the method of FIG. 6 to form the compositing matte 681. The spatially variable blur is applied to the binary depth map 112 according to the values in a 2-D array with the same dimensions as the depth map 112, termed a sigma map 911. In a step 910, performed by the processor 405 as directed by the program 433, the sigma map is generated from the clipped edge visibility map 671 obtained in the step 670. The preferred method uses the following equation:

$$\sigma\_map(x, y) = \frac{r_{psf}(1 - ev\_map(x, y))}{3} + 1$$

Each value in the clipped edge visibility map 671 subtracted from one is multiplied by the required maximum blur radius $r_{psf}$ in units of pixels, divided by three. The value of three is typically preferred, as the resulting blur width will be approximately three times the sigma value. The corresponding spatial location in the sigma map 911 is set to the result plus one. Sigma values for spatial locations outside the clipped edge visibility map 671 are set to zero.

Other formulations for mapping clipped edge visibility map values to sigma map values are possible. The desirable property of the sigma map is to smoothly span the desired range of blend widths between narrowest and widest based on the clipped edge visibility map.

In a following step 920, performed by the processor 405 as directed by the program 433, a Gaussian pyramid 921 is generated from the squared values of the sigma map 911. Algorithms for generating a Gaussian pyramid are known. For example the Matlab function impyramid($\sigma_{map}^2$, 'reduce') may be invoked iteratively to build each level of the image weighting pyramid. The number of levels required depends on the maximum value of the sigma map, with five being typical.

In a following step 930, performed by the processor 405 as directed by the program 433, a Laplacian pyramid 931 is built from the binary depth map 112. Each level of the Laplacian pyramid 931 is constructed by down-sampling the binary depth map 112 to form a down-sampled binary depth map 932 using impyramid(depth_map, 'reduce'), then up-sampling the result using impyramid(depth_map, 'expand) and then subtracting the result from the binary depth map 112. The down-sampled binary depth map 932 is used as input for the next level. The final pyramid level comprises just the down-sampled depth map from the previous level. The number of levels is typically one less than used for the Gaussian pyramid of the step 920. In a following step 940 the clipped compositing matte 141 is obtained by reconstructing the depth map 112 using the weights in the Gaussian pyramid. The function impyramid(previous_level_result, 'expand') is invoked iteratively for each level in reverse order to that used for pyramid construction in the step 930. The result is added to the product of the Laplacian and Gaussian pyramid data for the current level. The result is used as input to the next level of pyramid expansion.

The spatially variable Gaussian blur technique used in the step 680 is now described in further detail. Gaussian blur is the solution of the heat equation, which describes the diffusion of heat (or variation in temperature) u(x, y) in a given region over time t according to the following:

$$\frac{\partial u}{\partial t} - \Delta u = 0$$

where $\Delta$ denotes the Laplace operator $$\Delta u = \frac{\partial^2 u}{\partial x^2} + \frac{\partial^2 u}{\partial y^2}.$$

If an input image is seen as an initial heat map $u(t_0)$ at time $t_0=0$, the diffused heat map u(t) at a later time (t>0) is a Gaussian blurred version of the original image. The longer the time t is, the more blurred is the image u(t). Eventually, when t approaches infinity, the diffused heat map u(t) becomes completely flat, that is the heat is diffused evenly everywhere.

The heat diffusion can be implemented recursively involving two successive time instances of u $$u(t+dt)=u(t)+dt\cdot(u_{xx}(t)+u_{yy}(t))$$

where dt is a small time step (that is $|dt|<1$), $$u_{xx} = \frac{\partial^2 u}{\partial x^2}$$

and $$u_{yy} = \frac{\partial^2 u}{\partial y^2}$$

are the image's second derivatives, and $u_{xx}(t)+u_{yy}(t)=\Delta u(t)$ is the Laplacian image. The Laplacian image $\Delta u$ can be computed from the input image u via a convolution with a discrete Laplacia filter $$L = \begin{bmatrix} 0 & 1/4 & 0 \\ 1/4 & -1 & 1/4 \\ 0 & 1/4 & 0 \end{bmatrix}.$$

The amount of added blur in the future image u(t+dt) compared to the blur in the current image u(t) can be controlled by varying amount of added Laplacian dt. This is the underlying theory behind the disclosed implementation of space-variant Gaussian blur.

Unfortunately, the Gaussian blur approximation by Laplacian addition only applies for a small time step dt. As a result, dt cannot be increased indefinitely to obtain a blurred image with a Gaussian smoothing scale larger than the scale of the Laplacian filter. To reduce this limitation, variable amounts of Laplacians, computed at different scales, can be added to the image. This multi-scale variable Laplacian addition technique can be implemented efficiently using a Laplacian pyramid. This pyramidal implementation is illustrated in FIG. 11B.

Figure 11A:
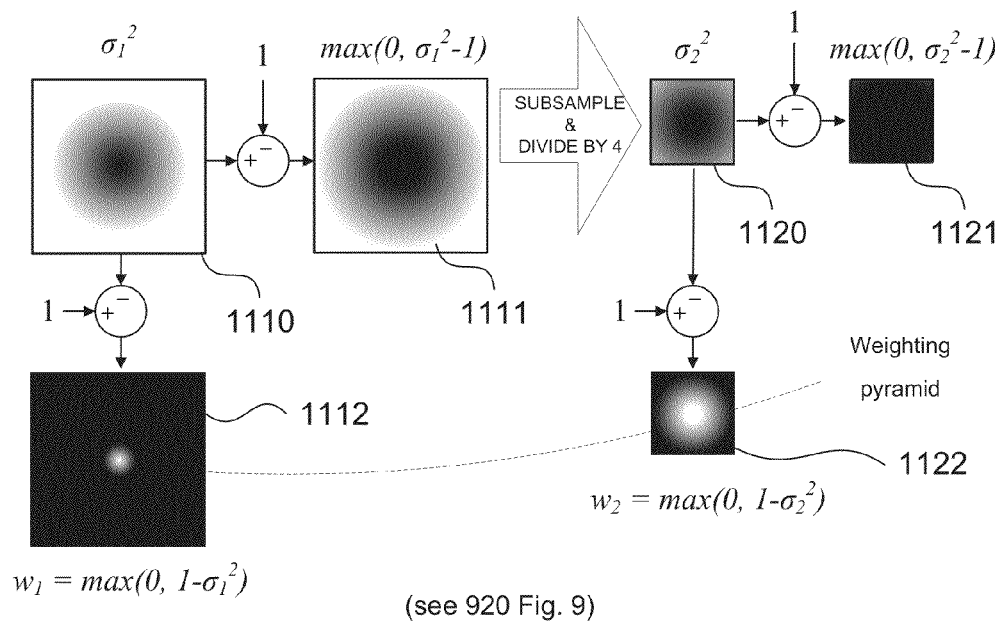
FIG. 11A illustrates in pictorial form a method to generate a weighting pyramid from a spatially variable sigma map.
Figure 11B:
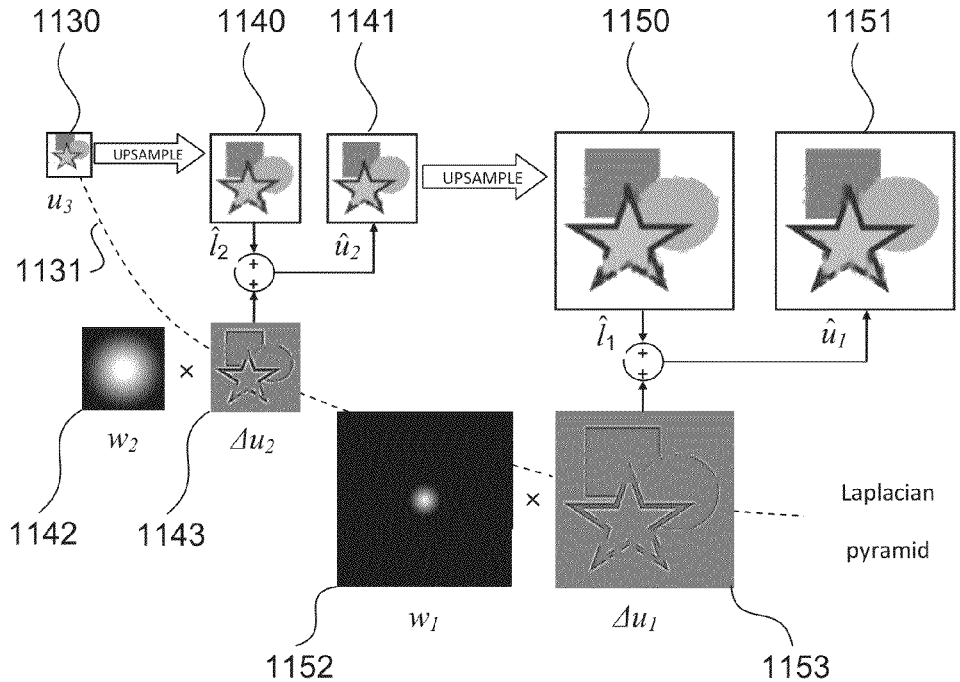
FIG. 11B illustrates in pictorial form a space-variant Gaussian filtering method using weighted Laplacian pyramid reconstruction.

FIG. 11B illustrates in pictorial form a space-variant Gaussian filtering method using weighted Laplacian pyramid reconstruction. The Laplacian pyramid of an input image u is a series of Laplacian images constructed at different scales. Laplacian images at coarser scales are subsampled to save memory and computation. In FIG. 11B, the Laplacian pyramid contains two Laplacian images $\Delta u_1$ (ie 1153) and $\Delta u_2$ (ie 1143) and a low-resolution image $u_3$ (ie 1130) as seen connected by a dashed line 1131. The sizes of these images are successively halved in each dimension, which is characteristic of a dyadic pyramid.

The weighted Laplacian pyramid construction process 940 starts by up-sampling the low-resolution image $u_3$ (ie 1130) at the top level of the pyramid to obtain a low-passed image $\hat{l}_2$ (ie 1140) at a second pyramid level. This low-passed image $\hat{l}_2$ is uniformly blurred with a Gaussian smoothing scale $\sigma \approx 1$ pixel compared to a properly subsampled version of u at the same resolution. A weighted version of the Laplacian image $\Delta u_2$ (ie 1143) is added to this low-passed image $\hat{l}_2$ to obtain a synthesized image $\hat{u}_2$ (ie 1141). Due to the variable amount of Laplacian added, this synthesized image $\hat{u}_2$ starts to have space-variant blur. The shape of the weight image $w_2$ (ie 1142) (where dark intensities correspond to zero weight and bright intensities correspond to unit weight) indicates that maximum amount of Laplacian is to be added to the centre part of the image and no Laplacian is to be added to the periphery. As a result, the central part of $\hat{u}_2$ stays sharp, while the image blur increases radially outwards. After the image $\hat{u}_2$ is obtained, another round of image up-sampling and weighted Laplacian addition is performed, which results in the low-pass image $\hat{l}_1$ (ie 1150) at the first pyramid level and the synthesized image $\hat{u}_1=\hat{l}_1+w_1\Delta u_1$. This synthesized image $\hat{u}_1$ (ie 1151) at the finest first level of the pyramid should have the desired space-variant Gaussian blur provided the weight images $w_1$ 1152 and $w_2$ 1142 are set correctly.

The step 920, performed by the processor 405 as directed by the program 433, to generate a suitable weighting pyramid $\{w_i\}_{i=1,2\ldots}$ given a desired space-variant Gaussian sigma map $\sigma_1$ is now described with reference to FIG. 11A. In this example, the desired blur variance $\sigma_1^2$ (ie 1110) is radially symmetric with small values at the centre of the image and large values at the periphery. Because the Laplacian image $\Delta u_1$ (ie 1153) is computed at a Gaussian scale of one pixel, variable Laplacian addition at this scale cannot approximate Gaussian blur sigma larger than one pixel. As a result, the weight $w_1$ (ie 1112) is zero where $\sigma_1^2 > 1$. For pixels with desired blur variance $\sigma_1^2 \leq 1$, the weight is set to $w_1=1-\sigma_1^2$. This formulation ensures that the Laplacian image $\Delta u_1$ is added in full ($w_1=1$) when no blur is desired ($\sigma_1^2=0$), retaining the original sharpness of the input image. As the desired blur variance $\sigma_1^2$ increases, a smaller fraction of the Laplacian image $\Delta u_1$ is added, which increases the blurriness of the output pixels up to a blur variance of one pixel. Using the first level of the Laplacian pyramid $\Delta u_1$, the maximum Gaussian blur that can be introduced to the image is therefore one pixel.

To introduce more blur to the image, the residual blur variance $\max(0, \sigma_1^2-1)$ (ie 1111) is passed on to the next pyramid level at half image resolution. The residual blur variance is subsampled by two times in each dimension. Due to the halving in image size, the blur variance at the next pyramid level $\sigma_2^2$ (ie 1120) is also reduced by a factor of $4=2\times 2$: $\sigma_2^2 = \max(0, \sigma_1^2-1)/4$, which is shown in FIG. 11A as a darker image compared to the blur variance at the first pyramid level $\sigma_1^2$.

FIG. 11A illustrates in pictorial form a method to generate a weighting pyramid from a spatially variable sigma map. The weight at the second pyramid level $w_2$ (ie 1122) is generated from this blur variance $\sigma_2^2$ using the same formula used in the first pyramid level: $w_2=\max(0, 1-\sigma_2^2)$. The residual blur variance at the second pyramid level (ie 1121) is $\max(0, \sigma_2^2-1)$. If this second residual blur variance is zero at every pixel, the weighting pyramid generation process can stop since no more blur is needed (which means Laplacian images from the third pyramid level onwards should be added in full). The weighting pyramid in FIG. 11A comprise two images $w_1$ (ie 1152) at input resolution and $w_2$ (ie 1142) at half input resolution, both are connected by the dashed line as shown.

Space-variant Gaussian filtering using weighted Laplacian pyramid construction as shown in FIG. 11A and FIG. 11B is very efficient. It is also hardware friendly because the process needs to access each pixel in each image in the pyramid only once. Processed images in the pyramid can be discarded immediately to reduce memory buffer requirements.

The weighted Laplacian pyramid construction algorithm illustrated in FIG. 11B can also be used to perform space-variant (ie spatially variable) image sharpening. As shown in FIG. 11B, high-frequency details of an image ($\Delta u_1$ 1153) can be added back to a low-passed filter image ($\hat{l}_1$ 1150) to obtain the original image $u_1$. If the weight $w_1$ is higher than one, the output image $\hat{u}_1$ is sharpened. Similar to space-variant Gaussian smoothing, the amount of image sharpening can be varied spatially by changing the weight image $w_1$ accordingly. Applications of space-variant image sharpening include, but are not limited to, extended depth of field from a single image or from multiple images, image de-blurring, vignetting correction and depth from defocus by matching of sharpened image patches.

Figure 10A:
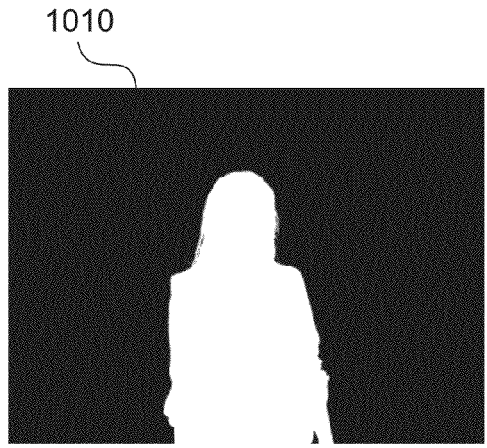
FIG. 10A illustrates in pictorial form an accurate two-layer depth map for a portrait scene is shown.
Figure 10B:
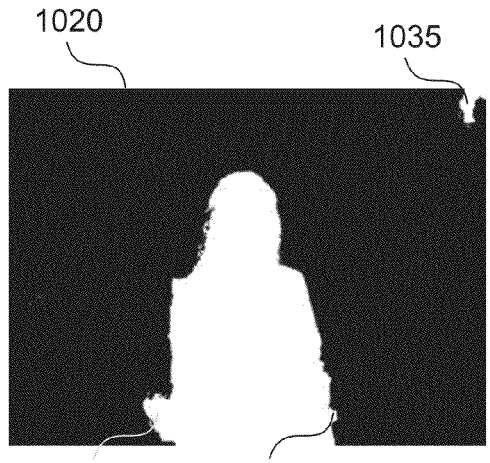
FIG. 10B illustrates in pictorial form a depth map which has been obtained using a depth from defocus algorithm.
Figure 10C:
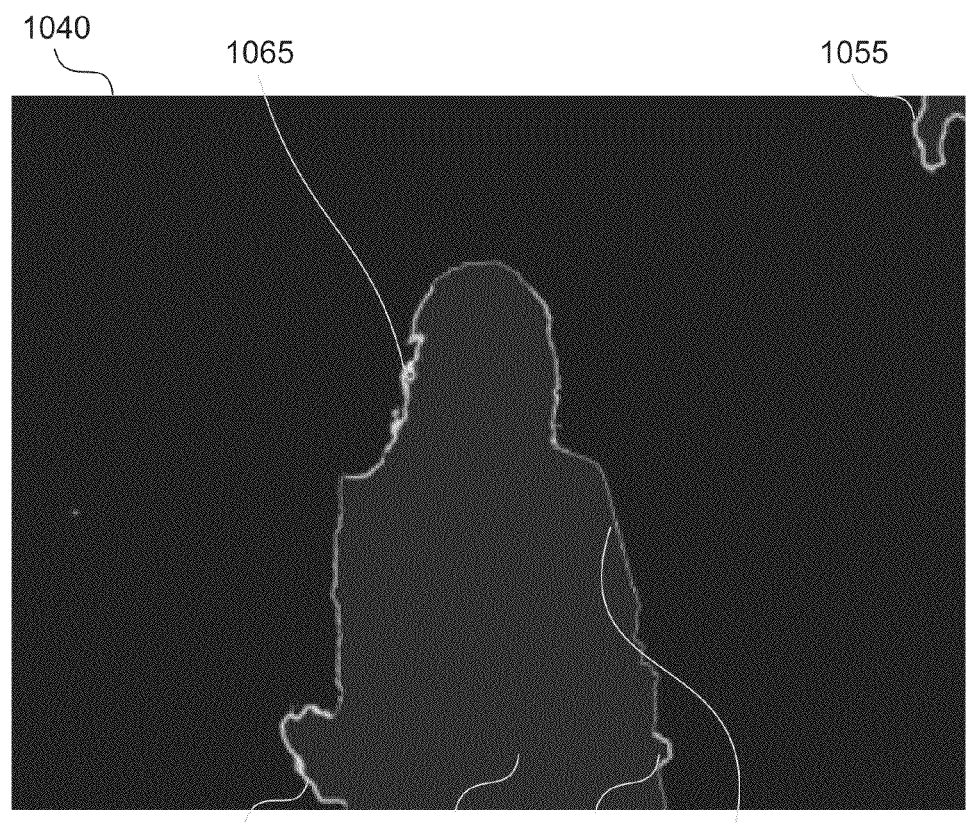
FIG. 10C illustrates in pictorial form an example of a compositing matte which has been generated using an inaccurate depth map.

FIGS. 10A to 10C illustrate an example of a compositing matte which has been generated using an inaccurate depth map.

FIG. 10A illustrates in pictorial form an accurate two-layer depth map 1010 for a portrait scene.

FIG. 10B illustrates in pictorial form a depth map for the same scene 1020 which has been obtained using a depth from defocus algorithm. Large regions where the background has incorrectly been assigned as foreground are labelled as 1025, 1030 and 1035.

FIG. 10C illustrates in pictorial form an example of a compositing matte which has been generated using an inaccurate depth map described as VBWC arrangement 1. Depth boundaries which correspond to the depth map errors shown in FIG. 10B have produced a wide blend in the compositing matte. These are labelled 1045, 1050 and 1055. Additionally, regions of fine structure, for example hair strands 1065 also result in a wide blend. Accurately mapped depth boundaries have produced a narrow blend in the composite map. For example, the edge labelled 1060. For clarity, in FIG. 10C the foreground region 1070 has been shaded dark grey rather than white to highlight the variable blend width in the compositing matte.

VBWC Arrangement 2

Figure 12:
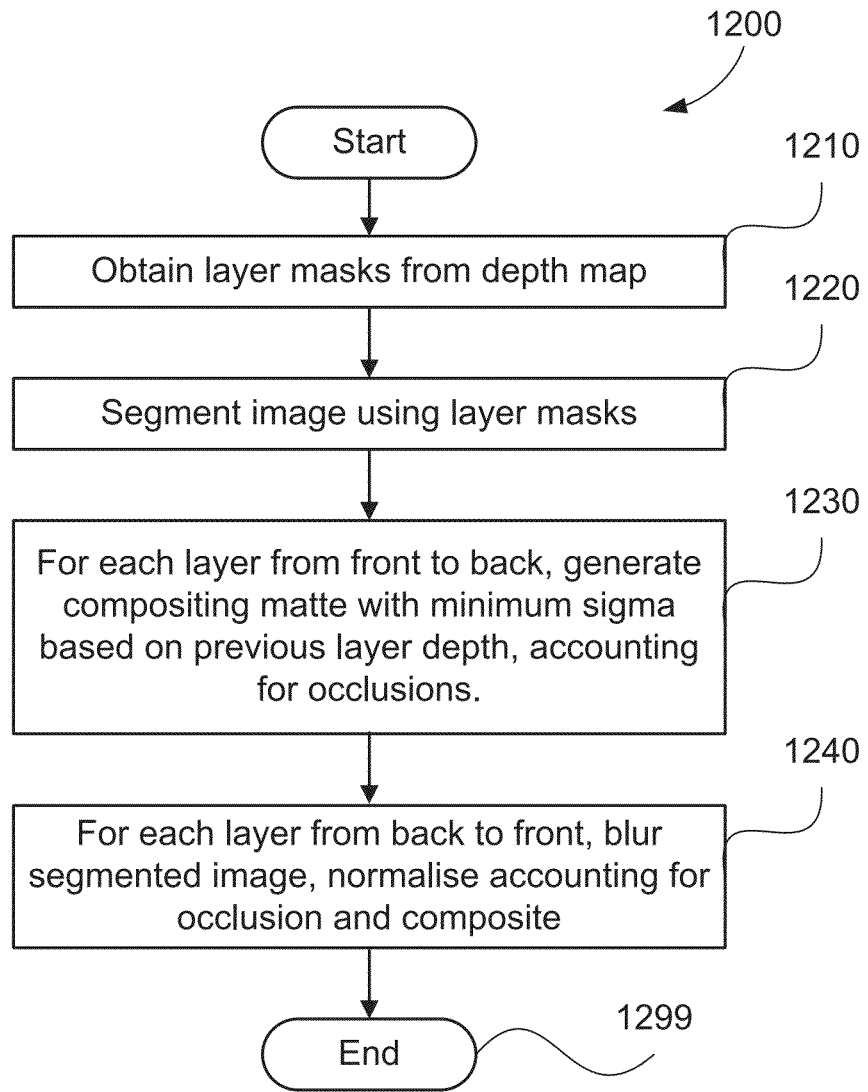
FIG. 12 is a schematic flow diagram illustrating a method of bokeh rendering for a depth map with multiple layers.

FIG. 12 is a schematic flow diagram illustrating a method of bokeh rendering for a multi-layer depth map ie a depth map with multiple layers. The multi-layer depth map contains a depth layer identifier at each pixel corresponding to the captured image. For example, regions of the image which are in the background layer may have an ID of 1 in the corresponding pixel locations in the depth map. Regions of the image at the next depth layer closer to the camera may have an ID of 2 in the corresponding pixel locations in the depth map. If there are N depth layers, regions of the image closest to the camera will have an id of N in the corresponding pixel locations in the depth map. The front image layer is assumed to correspond to the depth of the subject which is to remain in focus and image layers further back are towards the background and blurred appropriately. The algorithm operates in two stages. Firstly, a compositing matte is generated for each layer by processing depth map layers from front to back and then segmenting the image. The compositing matte is modified to account for occlusions. In the second stage, segmented image layers are blurred appropriately and composited from back to front, again taking into account occlusions by objects for different depth layers. The details of the two stages are now described.

In step 1210, performed by the processor 405 as directed by the program 433, a mask is obtained for each depth layer in the depth map according to the depth layer identifier. The mask value is set to one at pixel locations where the current layer is equal to the depth layer identifier and zero otherwise. In this way, regions of the image at each depth layer are identified. In step 1220, performed by the processor 405 as directed by the program 433, the image is segmented into multiple layers according to the depth layer masks. In step 1230 layers are processed in sequence from front to back. A compositing matte generated based on edge visibility as described in FIG. 6, 600. However, a minimum value of sigma used in step 680 is set at step 910 according to the PSF corresponding to the depth of the previous layer. The layer matte is modified by multiplication by the matte from the previous layer. The matte for the foreground layer is set to all ones. In step 1240, performed by the processor 405 as directed by the program 433, layers are processed from back to front. Each image layer is blurred according to the PSF corresponding to the depth for each layer. Intensity normalisation is required as described in step 540. However, the process must be modified to correctly account for occlusion by objects at different depth layers. An occlusion mask is set to all ones for the background layer. For subsequent layers, each layer mask is subtracted from the occlusion mask and the occlusion mask updated. The method described in step 540 is applied to the inverse of the occlusion mask for the current level to obtain a normalisation map. The blurred segmented image for the current level is multiplied by the compositing matte for the corresponding layer obtained in step 1220, the result is divided by the normalisation map and copied into the final image.

Example

The following examples provide illustrative cases of the VBWC arrangement.

As described in relation to FIGS. 4A and 4B, the VBWC arrangement may be embodied on a general purpose computer system. In the example VBWC arrangement implemented on a general purpose computer system, a camera captures an image of a scene and a depth map of the same scene. The image and the depth map are transferred to the general purpose computer system, where the steps of VBWC arrangement are carried out by the computer processor, producing an output bokeh image which is stored in the computer memory for later display or retrieval.

In a further example VBWC arrangement, the processing steps are carried out on the camera processing hardware, producing an output bokeh image which is stored in the camera memory or a removable memory device for later display or retrieval.

In a further example VBWC arrangement, the camera transfers the image and the depth map to a cloud computing server via a wired network connection or wireless network connection. The processing steps are carried out by processors in the cloud computing system, producing an output bokeh image which is stored on the cloud server for later retrieval or download, either to the camera or to a general purpose computer.

INDUSTRIAL APPLICABILITY

The arrangements described are applicable to the computer and data processing industries and particularly for the image processing industry.

The foregoing describes only some embodiments of the present invention, and modifications and/or changes can be made thereto without departing from the scope and spirit of the invention, the embodiments being illustrative and not restrictive.

In the context of this specification, the word "comprising" means "including principally but not necessarily solely" or "having" or "including", and not "consisting only of". Variations of the word "comprising", such as "comprise" and "comprises" have correspondingly varied meanings.

The invention claimed is:

1. A method of producing a rendered image with a blurred background from an initial image and a depth map of the image, said depth map identifying at least one foreground region and at least one background region of the image, said method comprising the steps of:

determining an edge visibility measure for at least one edge in the depth map by comparing a parameter value associated with a pixel in the foreground region near the edge with a parameter value associated with another pixel in the background region near the edge;

applying a spatially variable blur to the depth map to produce a compositing matte, wherein a size of a blur kernel used to form the spatially variable blur is dependent on the determined edge visibility measure;

applying a blur to image data in at least one background region of the depth map to form normalized blurred background image data; and compositing the blurred background image data with the initial image in a weighted average defined by the compositing matte to produce the rendered image with the blurred background.

2. A method according to claim 1, wherein the comparing step compares respective colours or textures of the respective pixels in the foreground region and the background region.

3. A method according to claim 1, wherein the comparing step compares averages of colour values or texture values of respective pluralities of pixels in the foreground region and the background region.

4. A method according to claim 1, wherein a spatial extent of the blurred background image data in the compositing matte is limited according to a size of a blur kernel.

5. A method according to claim 1, wherein the spatially variable blur is applied using a Gaussian filter.

6. An apparatus for producing a rendered image with a blurred background from an initial image and a depth map of the image, said depth map identifying at least one foreground region and at least one background region of the image, said apparatus comprising:

a processor; and a memory storing a non-transitory computer executable program for directing the processor to perform a method comprising the steps of:

determining an edge visibility measure for at least one edge in the depth map by comparing a parameter value associated with a pixel in the foreground region near the edge with a parameter value associated with another pixel in the background region near the edge;

applying a spatially variable blur to the depth map to produce a compositing matte, wherein a size of a blur kernel used to form the spatially variable blur is dependent on the determined edge visibility measure;

applying a blur to image data in at least one background region of the depth map to form normalized blurred background image data; and compositing the blurred background image data with the initial image in a weighted average defined by the compositing matte to produce the rendered image with the blurred background.

7. A computer readable non-transitory storage medium storing a computer executable program for directing a processor to execute a method of producing a rendered image with a blurred background from an initial image and a depth map of the image, said depth map identifying at least one foreground region and at least one background region of the image, said method comprising the steps of:

determining an edge visibility measure for at least one edge in the depth map by comparing a parameter value associated with a pixel in the foreground region near the edge with a parameter value associated with another pixel in the background region near the edge;

applying a spatially variable blur to the depth map to produce a compositing matte, wherein a size of a blur kernel used to form the spatially variable blur is dependent on the determined edge visibility measure;

applying a blur to image data in at least one background region of the depth map to form normalized blurred background image data; and compositing the blurred background image data with the initial image in a weighted average defined by the compositing matte to produce the rendered image with the blurred background.

\* \* \* \* \*